(12) United States Patent
Ezra et al.

(10) Patent No.: US 7,143,393 B1
(45) Date of Patent: Nov. 28, 2006

(54) METHOD FOR CACHE MANAGEMENT FOR POSITIONING CACHE SLOT

(75) Inventors: Josef Ezra, Ashland, MA (US); Daniel Lambright, Watertown, MA (US)

(73) Assignee: EMC Corporation, Hopkinton, MA (US)

( * ) Notice: Subject to any disclaimer, the term of this patent is extended or adjusted under 35 U.S.C. 154(b) by 728 days.

(21) Appl. No.: 10/178,085

(22) Filed: Jun. 24, 2002

Related U.S. Application Data

(63) Continuation-in-part of application No. 10/080,321, filed on Feb. 21, 2002.

(51) Int. Cl.
*G06F 9/44* (2006.01)
*G06F 12/00* (2006.01)

(52) U.S. Cl. ............... 717/127; 717/124; 717/125; 717/126; 717/129; 711/118; 711/125; 711/171

(58) Field of Classification Search ........ 717/124–129; 714/805; 711/206, 136, 145, 113, 134, 159, 711/171, 125, 118; 707/4; 709/223; 708/400
See application file for complete search history.

(56) References Cited

U.S. PATENT DOCUMENTS

| | | | |
|---|---|---|---|
| 5,206,939 A | | 4/1993 | Yanai et al. |
| 5,381,539 A | | 1/1995 | Yanai et al. |
| 5,592,432 A | | 1/1997 | Vishlitzky et al. |
| 5,629,950 A | * | 5/1997 | Godiwala et al. ............ 714/805 |
| 5,717,884 A | * | 2/1998 | Gzym et al. ................. 711/206 |
| 5,751,993 A | * | 5/1998 | Ofek et al. ................... 711/136 |
| 5,778,394 A | | 7/1998 | Galtzur et al. |
| 5,845,147 A | | 12/1998 | Vishlitzky et al. |
| 5,857,208 A | | 1/1999 | Ofek |
| 5,867,685 A | * | 2/1999 | Fuld et al. ................... 711/113 |
| 6,041,406 A | * | 3/2000 | Mann .......................... 712/227 |
| 6,073,129 A | * | 6/2000 | Levine et al. .................... 707/4 |
| 6,098,152 A | * | 8/2000 | Mounes-Toussi ............ 711/134 |
| 6,550,057 B1 | * | 4/2003 | Bowman-Amuah ......... 717/126 |
| 6,594,742 B1 | * | 7/2003 | Ezra ............................ 711/159 |
| 6,877,020 B1 | * | 4/2005 | Bratt et al. .................. 708/400 |
| 6,915,387 B1 | * | 7/2005 | Huffman et al. ............ 711/145 |
| 6,952,664 B1 | * | 10/2005 | Lahiri et al. .................. 703/14 |
| 7,013,456 B1 | * | 3/2006 | Van Dyke et al. .......... 717/130 |
| 2002/0099807 A1 | * | 7/2002 | Doyle .......................... 709/223 |
| 2002/0184612 A1 | * | 12/2002 | Hunt et al. .................. 717/116 |

OTHER PUBLICATIONS

Johnson et al., Run-time adaptive cache management, IEEE, vol. 7, Jan. 6-9, 1998 pp. 774-775.*

Johnson et al., Run-time cache bypassing, IEEE, vol. 48, Issue 12, Dec. 1999 pp. 1338-1354.*

(Continued)

*Primary Examiner*—Wei Zhen
*Assistant Examiner*—Satish S. Rampuria
(74) *Attorney, Agent, or Firm*—Muirhead and Saturnelli, LLC

(57) ABSTRACT

Described are techniques used in connection with cache management. Data included in a cache slot is put "on parole" with a first cache hit while waiting for subsequent cache hits. If a subsequent hit is received to the cache slot, it remains in the cache for a longer time period than a slot having only a first cache hit. The cache may be organized as a plurality of memory banks of cache slots. Each memory bank has an associated control slot that includes groups of extents of tags. Each cache slot has a corresponding tag, and a time stamp. The time stamp of slots in the cache may be adjusted affecting the amount of time a particular portion of data remains in the cache.

36 Claims, 20 Drawing Sheets

OTHER PUBLICATIONS

Bellas et al., Using dynamic cache management techniques to reduce energy in general purpose processors, IEEE, vol. 8, Issue 6, Dec. 2000 pp. 693-708.*

Westerholz et al., Improving performance by cache driven memory management, IEEE, Jan. 22-25, 1995 pp. 234-242.*

Biswas et al., Location caching in the mobile middleware platform, IEEE, Jan. 2002 pp. 172-173.*

So et al., Cache operations by MRU change, IEEE, vol. 37, Issue 6, Jun. 1988 pp. 700-709.*

Proceedings of the 2001 USENIX Annual Technical Conference, Boston, MA, USA; Jun. 25-30, 2001; "The Multi-Queue Replacement Algorithm for Second Level Buffer Caches" by Zhou et al.

Elizabeth J. O'Neil, et al., "The LRU-K Page Replacement Algorithm For Database Disk Buffering", pp. 1-19.

Pending U.S. Appl. No. 09/535,134, filed Mar. 24, 2000, entitled Segmenting Cache to Provide Varying Service Levels.

* cited by examiner

METHOD FOR CACHE MANAGEMENT FOR POSITIONING CACHE SLOT

RELATED APPLICATIONS

This application is a continuation-in-part of pending U.S. patent application Ser. No. 10/080,321, filed on Feb. 21, 2002, which is incorporated by reference herein.

BACKGROUND

1. Technical Field

This application generally relates to computer system, and more particularly to a cache used with a computer system.

2. Description of Related Art

Computer systems may include different resources used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests, such as data read and write operations and also administrative tasks, such as data backup and mirroring operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may nor correspond to the actual disk drives. Allowing multiple host systems to access the single storage device unit allows the host systems to share data stored therein.

Performance of a storage system may be improved by using a cache. In the case of a disk drive system, the cache may be implemented using a block of semiconductor memory that has a relatively lower data access time than the disk drive. Data that is accessed is advantageously moved from the disk drives to the cache so that the second and subsequent accesses to the data may be made to the cache rather than to the disk drives. Data that has not been accessed recently may be removed from the cache to make room for new data. Often such cache accesses are transparent to the host system requesting the data.

Data may be stored in a cache in order to increase efficiency. However, there can be a cost associated with performing cache management operations, such as storing and retrieving data from the cache.

One technique for implementing a cache is to store the data in blocks and link each of the blocks together in a doubly linked ring list referred to herein as a replacement queue. Each block of the replacement queue represents a block of data from a logical disk unit. The blocks or slots are placed in the doubly linked ring list in the order in which they are retrieved from the disk. A pointer may point to the block that was most recently added to the list. Thus, when a new block is to be added to the cache within the replacement queue, the structure of the replacement queue, in combination with the head pointer, may be used to determine the oldest block in the replacement queue that is to be removed to make room for the new block. An implementation of the replacement queue may use both a "head" pointer and a "tail" pointer identifying, respectively, the beginning and end of the replacement queue. The "tail" may determine the oldest block or slot in the replacement queue. Two such pointers may be used in an replacement queue arrangement as it may be desirable in accordance with cache management schemes in which some data may remain permanently in the cache and the "oldest" and "newest" data may not be adjacent to one another.

Cache management techniques are described, for example, in issued U.S. Pat. No. 5,381,539, Jan. 10, 1995, entitled "System and Method for Dynamically Controlling Cache Management", Yanai et al., assigned to EMC Corporation of Hopkinton, Mass., which is herein incorporated by reference, in which a data storage system has a cache controlled by parameters including: (a) a minimum number of data storage elements which must be retrieved and stored in cache memory and used by the system before the cache management system recognizes a sequential data access in progress; (b) the maximum number of tracks or data records which the cache management system is to prefetch ahead; and (c) the maximum number of sequential data elements to be stored in cache before the memory containing the previously used tracks or data records are reused or recycled and new data written to these locations. The cache memory is in a least-recently used circular configuration in which the cache management system overwrites or recycles the oldest or least recently used memory location. The cache manager provides monitoring and dynamic adjustment of the foregoing parameters.

Described in issued U.S. Pat. No. 5,592,432, Jan. 7, 1997, entitled "Cache Management System Using Time Stamping for Replacement Queue", Vishlitzky et al., which is herein incorporated by reference, is a system that includes a cache directory listing data elements in a cache memory and a cache manager memory including a replacement queue and data structures. A cache manager determines which data element should be removed or replaced in the cache memory based on the elapsed time the data element has been in the memory. If the elapsed time is less than a predetermined threshold, the data element will be maintained in the same location in the replacement queue saving a number of cache management operations. The predetermined threshold is established as the average fall through time (FTT) of prior data elements in the memory. A modified least-recently-used replacement procedure uses time stamps indicating real or relative time when a non-write-pending data element was promoted to the tail of the replacement queue, the most-recently used position. Also disclosed is another embodiment in which the number of times the data element is accessed while in the memory is compared to a fixed number. If the data element has been accessed more than the fixed number, it is placed at the tail of the replacement queue ensuring a longer period for the data element in the memory.

Described in U.S. Pat. No. 5,206,939, Apr. 27, 1993, entitled "System and Method for Disk Mapping and Retrieval", Yanai et al, which is herein incorporated by reference, is a device-by-device cache index/directory used in disk mapping and data retrieval.

Different techniques may be used to manage the cache. In particular, different approaches may be used in determining the amount of time a portion of data remains in the cache, such as the least recently used (LRU) approach. Additionally, different management techniques may be used in accordance with different types of caches since one particular technique may work well with one type of cache but not necessarily another. A type of cache may be characterized in accordance with one or more parameters or properties describing behavioral characteristics of the cache. For example, a type of cache included in a host computer system may use different cache management techniques than a cache included in a data storage system.

Thus, it may be desirable and advantageous to have an efficient cache management technique that takes into account characteristics that may generally be associated with a particular cache included in a data storage system.

SUMMARY OF THE INVENTION

In accordance with one aspect of the invention is a method executed in a computer system for cache management of a cache comprising: determining whether a current request for requested data is associated with a cache slot currently in said cache; positioning a cache slot associated with said requested data, in response to determining that said current request is not associated with a cache slot currently in said cache, to a first position in the cache; determining whether said requested data is in the cache; if said requested data is not in the cache and said requested data is associated with a cache slot currently in the cache, positioning said cache slot to a second position in the cache wherein said second position causes said cache slot to remain in said cache at least as long as if said cache slot is at said first position; and if said requested data is in the cache and said requested data is associated with a cache slot currently in the cache, positioning said cache slot to a third position within the cache wherein said third position causes said cache slot to remain in said cache as least as long as if said cache slot is at said second position.

In accordance with another aspect of the invention is a computer program product for cache management of a cache comprising: machine executable code that determines whether a current request for requested data is associated with a cache slot currently in said cache; machine executable code that positions a cache slot associated with said requested data, in response to determining that said current request is not associated with a cache slot currently in said cache, to a first position in the cache; machine executable code that determines whether said requested data is in the cache; machine executable code that, if said requested data is not in the cache and said requested data is associated with a cache slot currently in the cache, positions said cache slot to a second position in the cache wherein said second position causes said cache slot to remain in said cache at least as long as if said cache slot is at said first position; and machine executable code that, if said requested data is in the cache and said requested data is associated with a cache slot currently in the cache, positions said cache slot to a third position within the cache wherein said third position causes said cache slot to remain in said cache as least as long as if said cache slot is at said second position.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
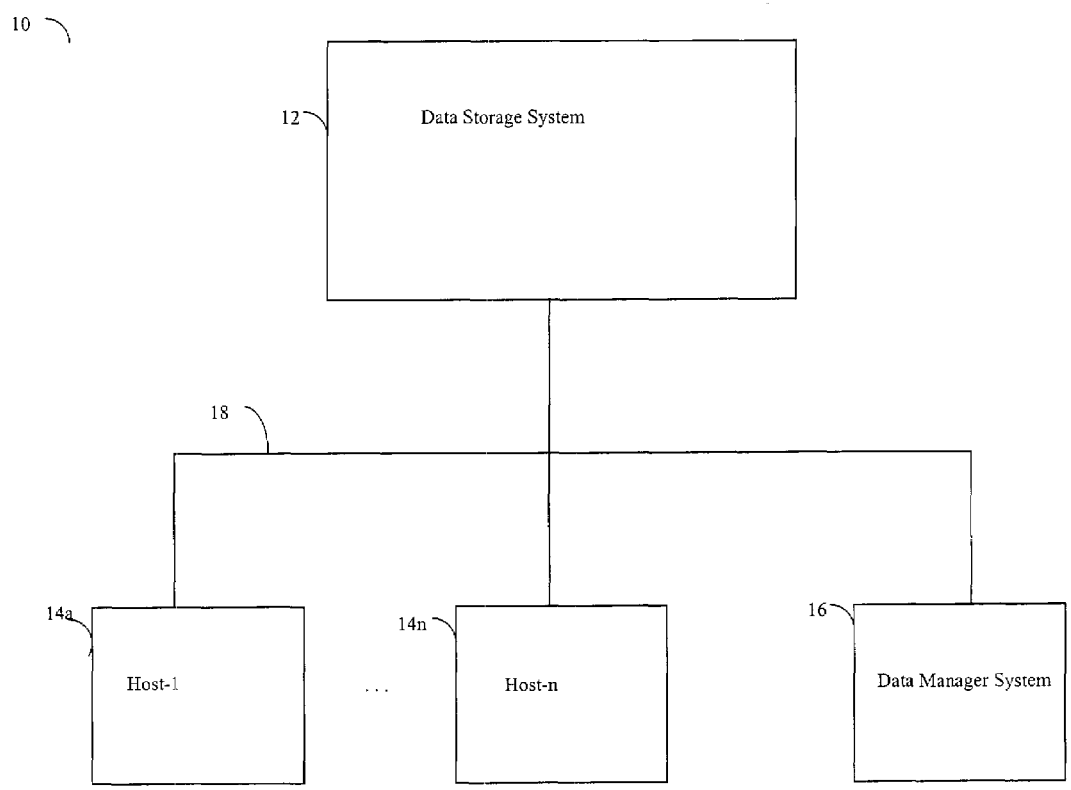
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a–14n, and a data manager system 16 through communication medium 18. In this embodiment of the computer system 10, the N hosts 14a–14n and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a–14n, and the data manager system may access and communicate with the data storage system 12, and may also communicate with others included in the computer system 10.

Each of the host systems 14a–14n, the data manager system 16, and the data storage system 12 included in the computer system 10 may be connected to the communication medium 18 by any one of a variety of connections as may be provided and supported in accordance with the type of communication medium 18. The processors included in the host computer systems 14a–14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a–14n and the data manager system 16, as well as those components that may be included in the data storage system 12 are described herein in more detail, and may vary with each particular embodiment. Each of the host computers 14a–14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a–14n may issue a data request to the data storage system 12 to perform a data operation. For example, an application executing on one of the host computers 14a–14n may perform a backup, mirroring or other administrative operation and may do so while performing data requests to the data storage system 12.

Figure 2:
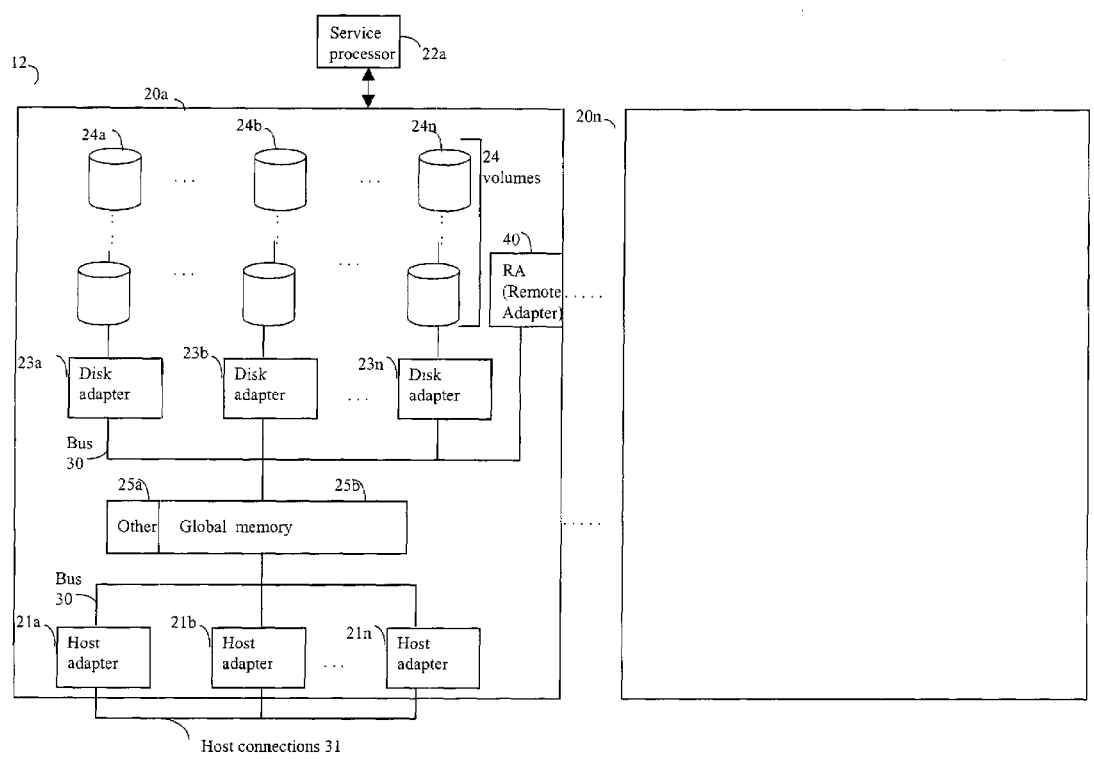
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20a–20n as manufactured by EMC Corporation of Hopkinton, Mass. In this particular example, each of the Symmetrix™ storage systems 20a–20n may be interconnected (not shown) as well as to the host and data manager systems through any one or more communication connections 30 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of 20a–20n may be resources included in an embodiment of the computer system 10 to provide storage services to, for example, host computer systems and/or the data manager system.

Each of the Symmetrix™ systems, such as 20a, may include a plurality of disk devices or volumes, such as the arrangement 24 consisting of n rows of disks or volumes 24a–24n. In this arrangement, each row of disks or volumes may be connected to a disk adapter ("DA") or director responsible for the backend management of operations to and from a portion of the disks or volumes 24. In the Symmetrix™ system 20a, a single DA, such as 23a, may be responsible for the management of a row of disks or volumes, such as row 24a. Each of the DAs 23a–23n are connected, for example, by a bus 30 to a cache that includes a particular portion designated as global memory 25b. The DAs 23a–23n may perform data operations to and from the cache that may be included in the global memory 25b, for example, in communications with other disk processors or directors, and other components of the system 20a. Generally, the global memory 25b may be used in facilitating communications between components in the system 20a. The other portion 25a is that portion of memory that may be used in connection with other designations that may vary in accordance with each embodiment.

An embodiment of the Symmetrix™ system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements in connection with a data request as may be made from the different host computer systems 14a–14n. This performance data may be gathered and stored, for example, in the global memory and/or other storage area.

The system 20a may also include one or more host adapters ("HAs") or directors 21a–21n. Each of these HAs may be used to manage communications and data operations between one or more host systems and the global memory.

The particular data storage system as described in this embodiment, such as a Symmetrix™ system by EMC Corporation or a disk, should not be construed as a limitation. Other types of commercially available data storage systems, as well as processors and hardware controlling access to these particular devices, may be also be included in an embodiment.

Also shown in the storage system 20a is an RA or remote adapter 40. The RA may be hardware including a processor used to facilitate communication between data storage systems, such as between two Symmetrix data storage systems. The RA may be used with the Remote Data Facility (RDF) product provided by EMC Corporation of Hopkinton, Mass.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a Symmetrix data storage system and a host system. The RAs may be used in facilitating communications between two Symmetrix data storage systems. The DAs may be used in connection with facilitating communications to the associated disk drive(s) and LV(s) residing thereon.

The DA may cause I/O operations to be performed on a volume or device. In the following description, data may be accessed by LV in which a single DA manages data requests in connection with I/O operations in connection with multiple LVs that may reside on a disk. The DA may accomplish this by creating job records for the different LVs associated with the particular DA. These different job records may be associated with the different LVs in a data structure stored and managed by each DA.

As described above, an embodiment may include a cache in the global memory portion 25*b* of FIG. 2. An embodiment may include a single or multiple replacement queue arrangement in the cache. An example of an embodiment that includes a cache using multiple replacement queues is described in pending U.S. patent application Ser. No. 09/535,134, entitled "Segmenting Cache to Provide Varying Service Levels", filed Mar. 24, 2000, and assigned to EMC Corporation of Hopkinton, Mass. An example of a system with a single cache memory is described in issued U.S. Pat. No. 5,381,539, Yanai et al., entitled "System and Method for Dynamically Controlling Cache Management", and also assigned to EMC Corporation of Hopkinton, Mass.

It should be noted that in an embodiment including a multiple replacement queue arrangement, there may be separate policies, decisions and data collections for one or more of the replacement queues in accordance with restrictions as to what devices use which of the replacement queues. This may vary with each embodiment.

Figure 3:
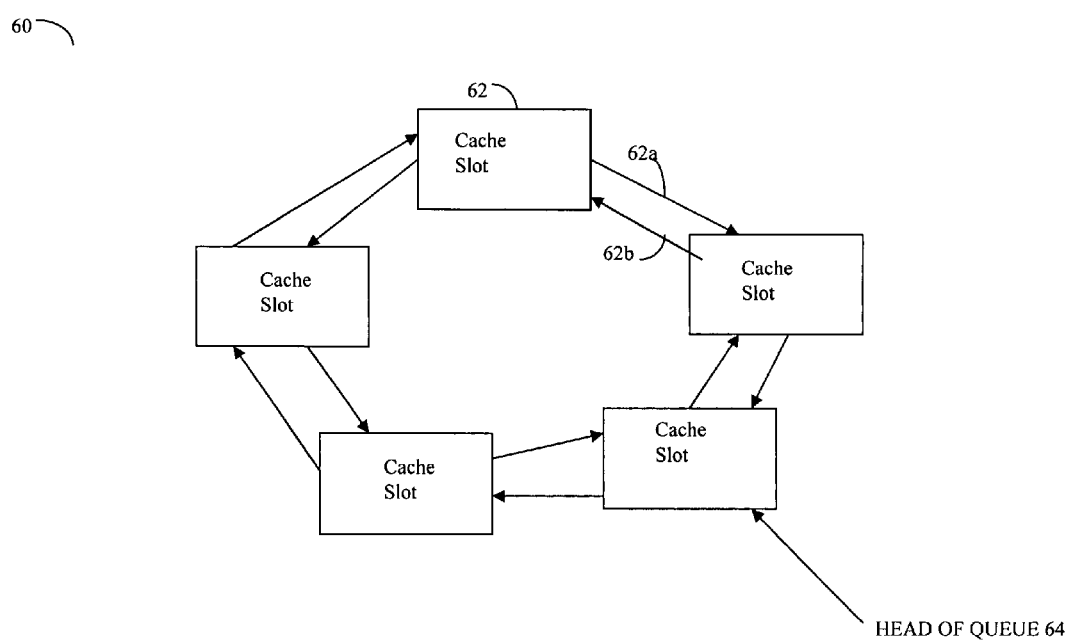
FIG. 3 is an example of an embodiment of a queue that may be used in implementing a cache.

Referring now to FIG. 3, shown is an example of an embodiment 60 of a replacement queue. Shown in the representation 60 is a circular structure in which each of the elements, such as 62, corresponds to a cache slot. Each cache slot may correspond to a portion of memory, such as one or more memory blocks. Each memory block may correspond to, for example, a track on one of the drives shown in connection with FIG. 2. In this representation, each of the slots are connected to other slots by forward and backward pointers, such as 62*a* and 62*b*, in a doubly linked list arrangement. Additionally, the head or beginning of the replacement queue is designated by a head pointer 64.

It should be noted that as described herein, an embodiment may include a cache which is in the form of the replacement queue using doubly linked list or other data structures known to those of ordinary skill in the art. The replacement queue described herein should not be construed as a limitation to the techniques described herein. Additionally, it should be noted that an embodiment may use a least-recently-used or other technique in determining which slots remain in the cache and which ones are removed.

Figure 4:
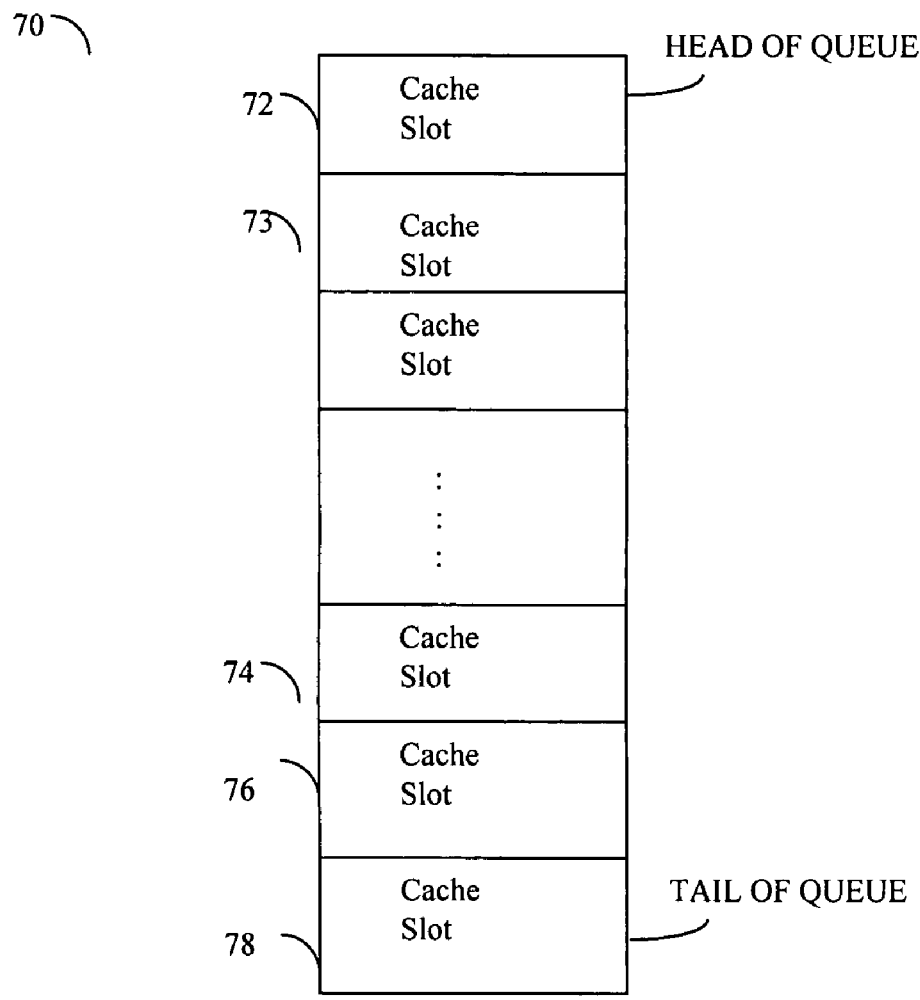
FIG. 4 is another representation of the queue of FIG. 3.

Referring now to FIG. 4, shown is an equivalent representation 70 of the previously described replacement queue 60 in connection with FIG. 3. The representation shown in FIG. 4 is a logical equivalent of the representation shown in FIG. 3. The representation 70 of FIG. 4 logically corresponds to that in FIG. 3 such that, for example, element 72 corresponds to the beginning cache slot as noted by the head of the replacement queue pointer 64 in connection with the previously described figure. Similarly, the last element of the replacement queue is denoted by slot 78 which in this example is labeled also as the tail of the replacement queue. Elements or slots may be inserted into the list at the head of the replacement queue and exit or leave the cache at the tail of the replacement queue. For example, when an element is deposited into the cache, it may be placed at the head of the replacement queue in slot location denoted by 72 in connection with a read operation. Additional elements may be progressively added to the head portion or other location within the replacement queue 72. As elements are added to the queue, subsequent elements progress toward the tail of the list. When another slot is added to the replacement queue at position 72, the slot currently at position 72 moves to that slot designated as position 73 and the newly added element falls into the position of element 72.

An element may be placed in the replacement queue, for example, when an element is referenced in connection with an I/O operation such as a cache miss for a read operation, or in connection with processing pending write operations, for example. Once in the replacement queue, an element progresses through the replacement queue from the head 72 towards the tail 78 of the replacement queue.

The foregoing queue arrangement in connection with a cache or shared memory may have drawbacks. For example, exclusive access to the queue may be implemented using a locking mechanism that only allows a single process to access the entire queue. Additionally, pointer manipulation in connection with performing management operations may also be expensive. These are described in more detail elsewhere herein.

Figure 5:
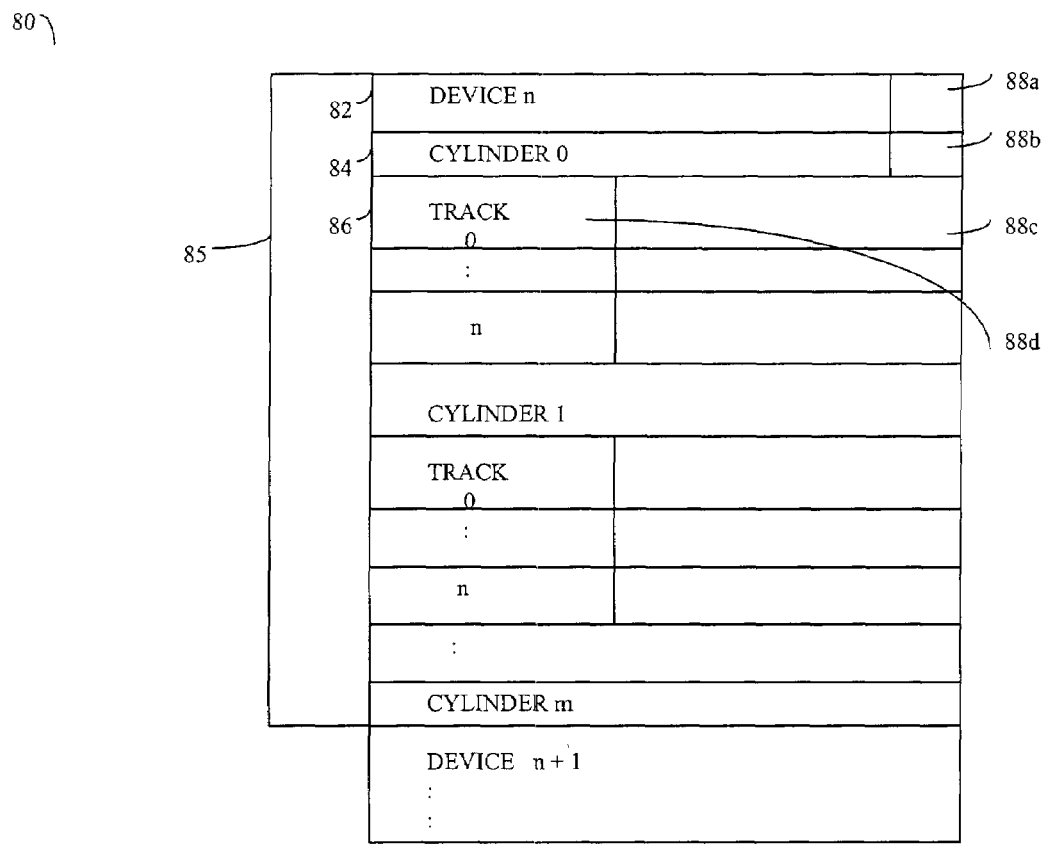
FIG. 5 is an example of an embodiment of a cache index or directory.

To indicate the data that is stored in the cache, a cache index or directory may be used. An embodiment may implement this using any one of a variety of different arrangements and structures. FIG. 5 shows one particular representation illustrating a device-by-device cache mapping.

Referring now to FIG. 5, shown is an example of a representation of a cache index/directory table. The table 80 may be organized on a device-by-device level to indicate for a particular portion of a device, is the portion in cache, and if so, where in cache is it located. An embodiment that includes devices, for example, such as disks, may include a further refinement or granularity in the table 80 corresponding to a location in cache.

The table 80 may include a hierarchical structure relative to the structure of a disk, such as cylinders and tracks on a disk. Each device, such as device n, may have a corresponding portion 85 included in the table. Each of the portions 85 may further be divided into sections in accordance with the disk structure. A portion 85 may include device header information 82, information for each cylinder 84 and for each track within each cylinder 86. For a device, a bit indicator 88*a* may indicate whether data associated with the device is stored in cache. The bit indicator 88*b* may further indicate for a particular cylinder within a device, is any data stored in the cache. Associated with each track may be a corresponding portion 88*c* indicating whether data associated with a particular track is in the cache and an associated address of where in the cache the data for a particular track may be found, for example, in connection with performing a read operation or a pending write operation. The portion 88*d* may include other information associated with a particular track, such as a valid cache address if data is stored in the cache for the particular track.

Figure 6:
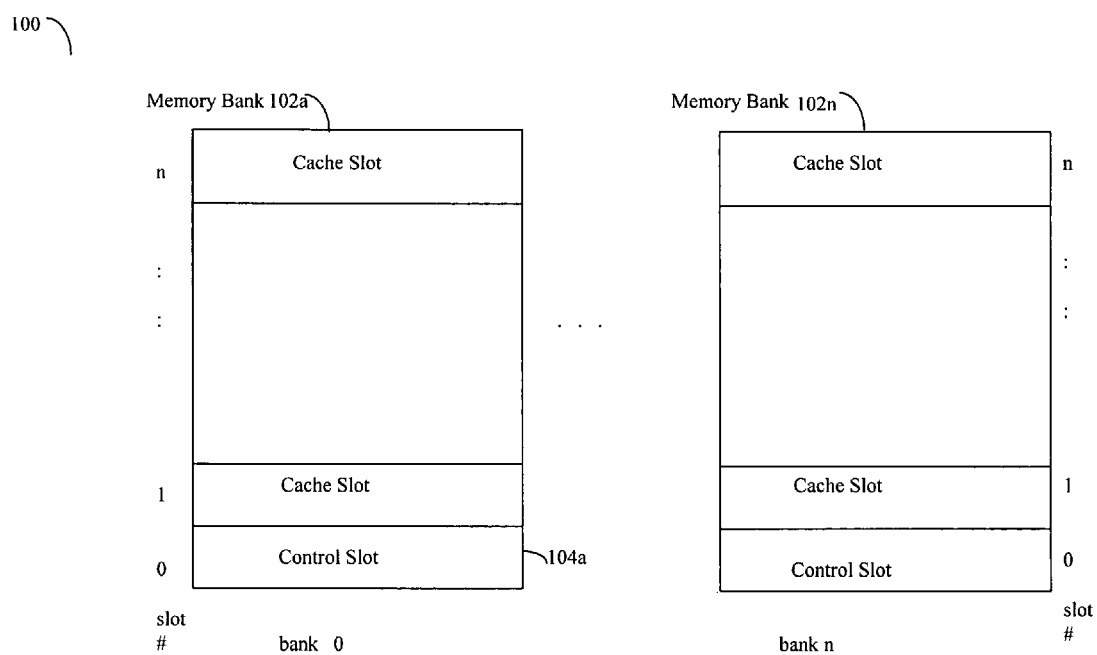
FIG. 6 is an example of an embodiment of a cache organization having a plurality of memory banks.

Referring now to FIG. 6, shown is an example of another representation of a cache in one embodiment. In this illustration, the cache 100 is organized into memory banks 102*a*–102*n* corresponding, respectively, to bank 0 through n. Each memory bank may be further divided into slots. Each memory bank, such as 102*a*, may include a control slot, such as 104a that includes information regarding the slots included in the respective memory bank.

It should be noted that the cache index or directory as shown in FIG. 5, for example, may be used in connection with any one or more of a variety of different cache arrangements, such as those in FIG. 3 as well as FIG. 6.

Figure 7:
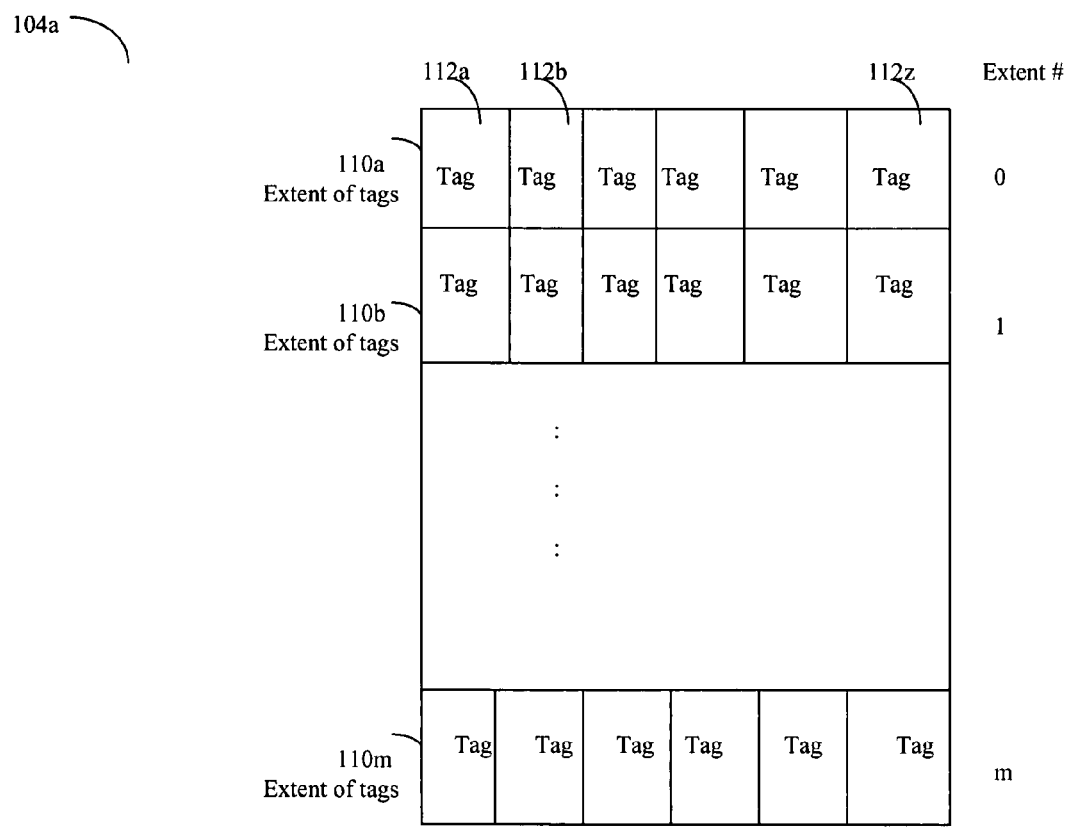
FIG. 7 is an example of an embodiment of a control slot associated with each memory bank.

Referring now to FIG. 7, shown is a more detailed description of the control slot 104a from FIG. 6. The control slot 104a may include information about the other slots in the memory bank. In this example, the control slot 104a may be further divided into extents or groups of tags, such as 110a–110m. Other slots in the memory bank 102a that includes control slot 104a may have a corresponding tag, such as 112a. In one embodiment, the tag size selected is 2 bytes or 16 bits. However, other tag sizes may be used in other embodiments. The tag may include information about the associated cache slot and is described in more detail in following paragraphs.

Each extent, such as 10a–10m, may refer to a number of tags that may vary in accordance with each embodiment. In one embodiment, the number of tags in an extent is the number of tags which may be read in a single direct memory access (DMA), for example, by a DA. Each chunk or portion may include, for example, 120 or 82 tags. Other numbers of tags may be associated with a single chunk or portion that may vary in accordance with each embodiment.

An embodiment may store the cache directory or table, cache, or portions thereof in global memory, for example, as included in FIG. 2 for a particular data storage system. Once in global memory, a DA may perform a DMA (direct memory access) and obtain a copy of a portion of the tags. The portion of the tags may be placed on another portion of memory local to the DA and utilization of this local copy is described in following paragraphs.

Figure 8:
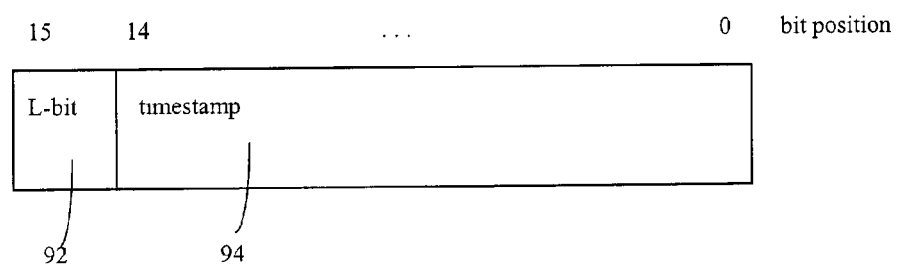
FIG. 8 is an example of a tag as included in the cache slot of FIG. 7.

Referring now to FIG. 8, shown is a more detailed representation of a tag 112a as included in FIG. 7. The 2 byte tag 112a includes an L-bit 92 and a 15 bit time stamp value 94. The L-bit, which may be the upper bit in the 2-byte tag arrangement, may be used to indicate the availability of a cache slot associated with the particular tag. This L-bit may be used in performing operations in which a processing step may be to obtain a cache slot. Associated processing operations are described in more detail elsewhere herein in following paragraphs. The time stamp value indicates, within a particular resolution, such as ½ second, when the associated slot was last used. For example, when there is a cache "hit" to a particular slot, the associated time stamp is updated with new time stamp value.

One technique may determine which slot to use, for example, by determining the age of each slot using the associated time stamp and selecting the oldest one. Additionally, an embodiment may also use a special time stamp value to indicate that a tag corresponds to a slot which is available and includes data that is not relevant. A tag corresponding to a slot including data that is not relevant may also be referred to as a scratch slot in a pool of available slots.

Data may be stored in the cache in connection with performing data operations. Different processing steps may be performed using the cache in connection with performing different data operations. For example, when a read request is received from a host computer, a determination may be made as to whether the requested data is in the cache. If so, the data is returned. Otherwise, the data may be read from the particular data storage device, stored in the cache and then sent to the host system. A slot from the cache is determined in which to store the data. When a write operation is performed, an embodiment may stored the data in the cache as a pending write which is actually written to memory at some later point in time in accordance with system specific policies. When the data is written to memory, a cache slot may be freed to be added to the pool of available or "free" slots. What will now be described are processing steps that may be performed in an embodiment in connection with cache management operations, for example, such as those just described for read and write operations.

Figure 9:
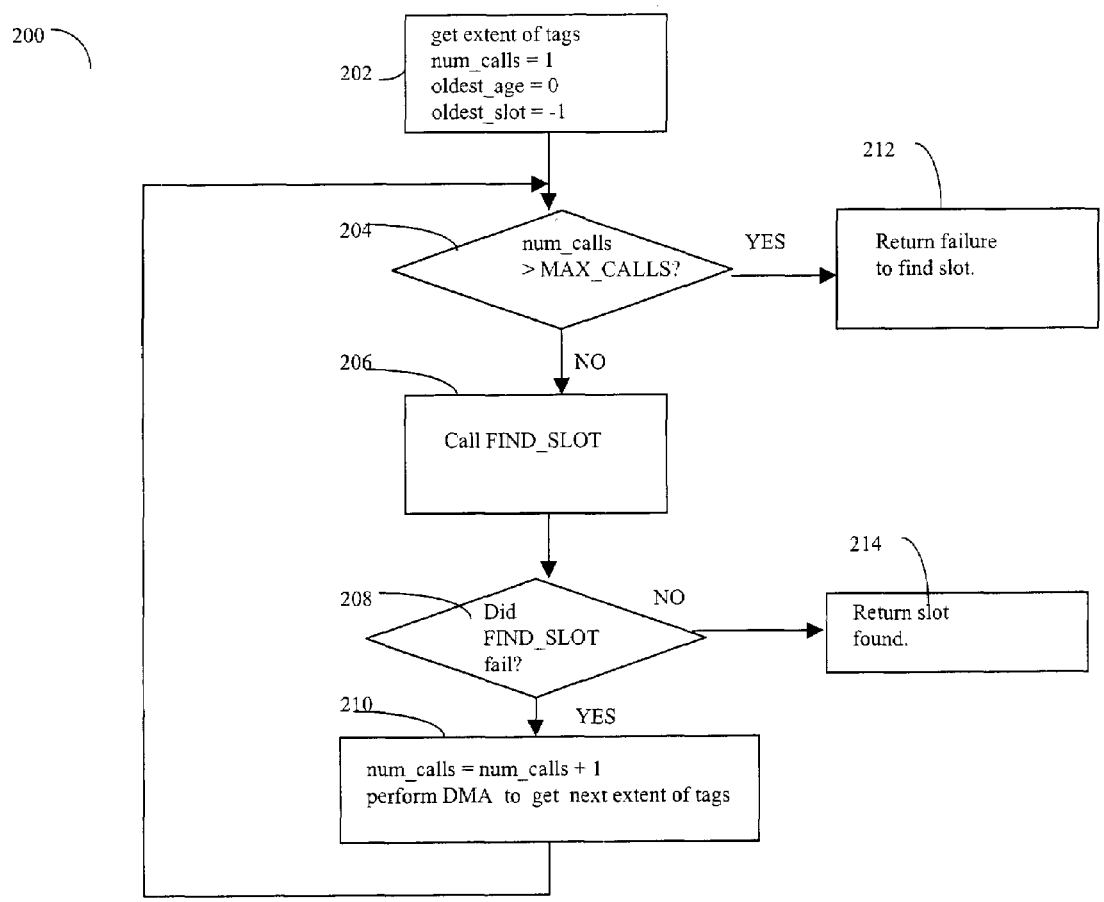
FIGS. 9–12 are flowcharts of processing steps of an embodiment for obtaining a cache slot.

Referring now to FIG. 9, shown is a flowchart of steps of an embodiment for obtaining a slot from the cache. Generally, the technique searches for an available slot or displaces the oldest slot. These steps may be performed by each DA or other processor, for example, within a system such as described in connection with FIG. 2.

At step 202, a first extent of tags is read from global memory and a local copy is made. Additionally, variable num_calls is initialized to 1, oldest_slot=−1 and oldest_age to 0. Num_calls tracks the number of times FIND_SLOT is called and fails after a predetermined number. Oldest_age tracks the age of the oldest slot and oldest_slot accordingly is an identifier corresponding to the oldest slot. Control proceeds to step 204 where a determination is made as to whether the number of calls exceeds a predetermined maximum, MAX_CALLS. If so, control proceeds to step 212 where a failure is returned. Otherwise, control proceeds to step 206 where a routine FIND_SLOT is called, which is described in more detail in following paragraphs. FIND_SLOT attempts to locate and return a cache slot for use. It should be noted that MAX_CALLS may be a predetermined value that may vary in accordance with each embodiment. For example, in one embodiment, MAX_CALLS is 100.

It should be noted that in connection with step 202, a new extent or portion of tags may be obtained with each invocation of steps of flowchart 200. Thus, each time each processor attempts to find a slot within an extent of tags, a new extent of tags is obtained. This technique may be used in connection with distributing the number of slots available for use in any particular extent to approximate a uniform distribution. It may be desirable to have a uniform distribution of the number of free slots in any particular extent. Using a new extent each time is one technique that may be used in connection with attempting to obtain the uniform distribution of slots available for use.

Additionally, when there are multiple processors each attempting to locate an available slot, techniques may be used in connection with determining the next subsequent extent of tags for each processor in order to minimize clustering. In other words, techniques may be used such that each processor attempts to locate an available slot from different extents of tags to minimize the likelihood that a first and a second processor look in the same extent of tags. Accordingly, these techniques may also minimize the likelihood that any two processors may be attempting to access the same available slot. Techniques for use with multiple processors, such as using a relative prime extent increment, are described elsewhere herein in more detail.

Experimentation by the inventors has shown that use of the foregoing techniques may result in a distribution of the number of free slots in any given extent of tags which approximates a uniform distribution as a best case and a normal distribution as a worst case.

Control proceeds to step 208 where a determination is made if FIND_SLOT succeeded or failed in locating a cache slot for use. If a slot is found, control proceeds to step 214 where the determined slot is returned. Otherwise, if FIND_SLOT failed, control proceeds to step 216 where num_calls is incremented by 1 and a global memory read is performed to get the next extent of tags. Control then proceeds to step 204 where processing then continues.

Figure 10:
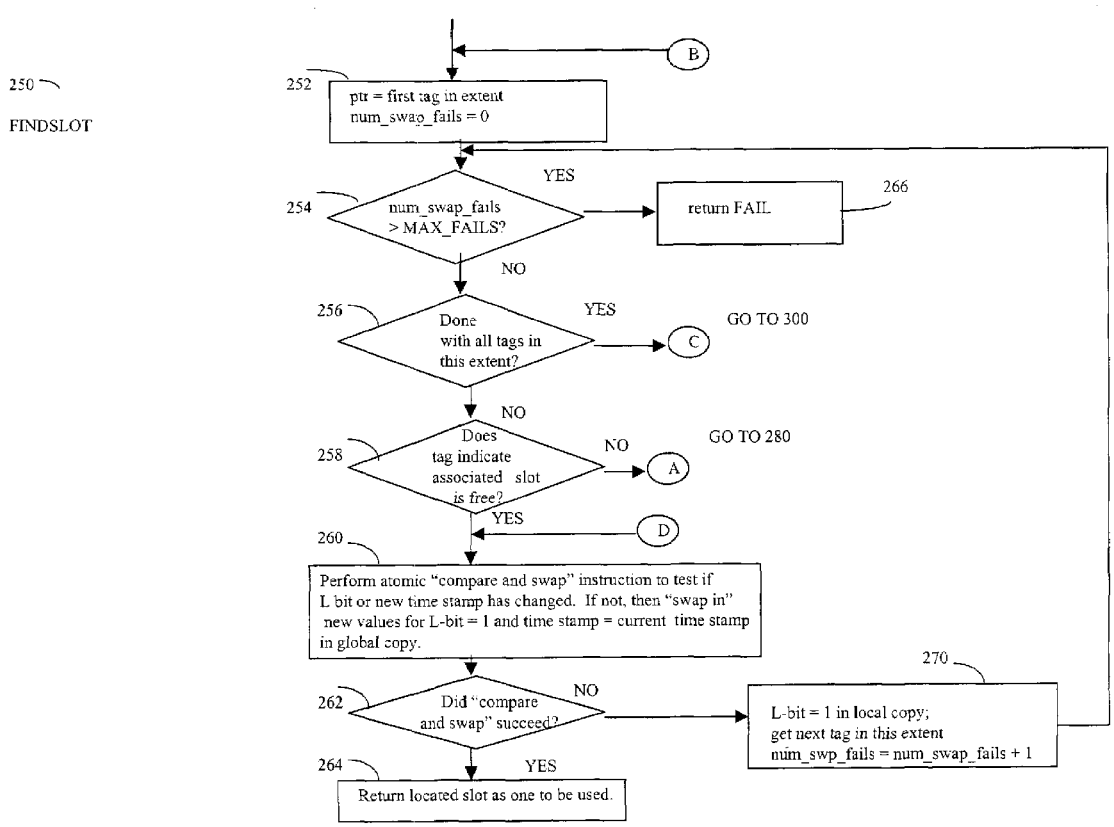

Referring now to FIG. 10, shown is a flowchart 250 of processing steps performed in connection with the FIND_SLOT routine. At step 252, ptr is assigned to point to the first tag in the current extent of tags. Additionally, the num_swap_fails tracking variable is initialized to 0. num_swap_fails counts the number of failed swaps as described in following paragraphs. At step 254, a determination is made as to whether num_swap_fails exceeds a predetermined maximum. In one embodiment, MAX_FAILS may be 4. Other embodiments may have other values for MAX_FAILS that may vary from that described herein. It should be noted that each DA, director or processor has its own unique ptr such that, each DA, for example, may attempt to obtain a slot from locations different than that of other DAs. If a determination is made at step 254 that the maximum number of failed swap attempts has been exceeded, control proceeds to step 266 where failure is returned. Otherwise, control proceeds to step 256.

Figure 12:
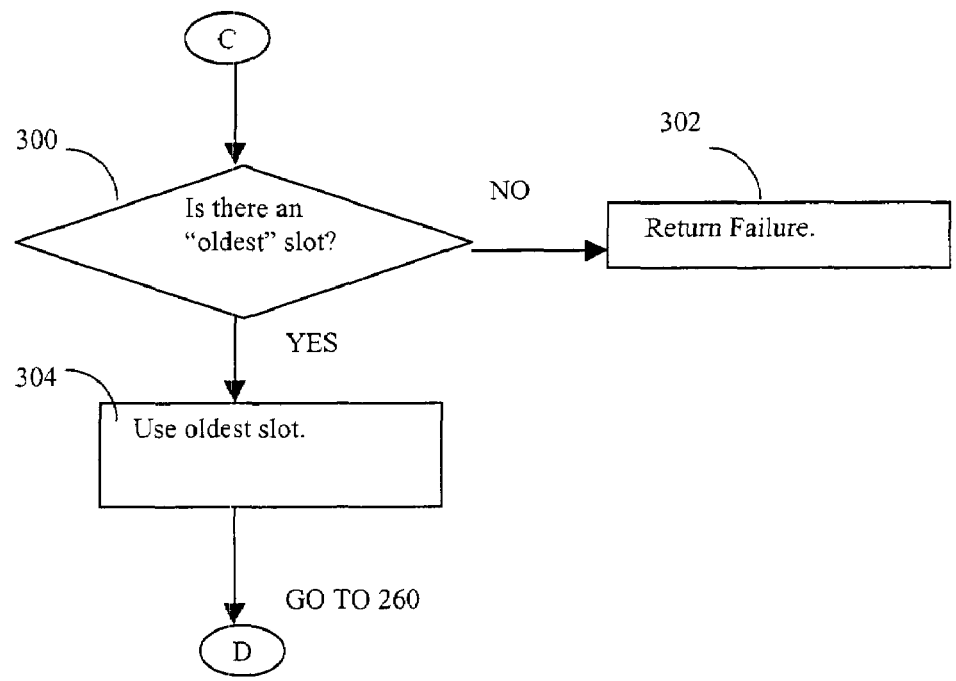

At step 256, a determination is made as to whether processing is complete for all tags in this extent. If so, control proceeds to step 300 in FIG. 12 where a determination is made as to whether there is an "oldest" slot. If so, this slot is used as the available slot, as in step 304, and control proceeds to step 260. Otherwise, control proceeds to step 302 where failure is returned.

If, at step 256, a determination is made that all tags in this extent have not been examined, in accordance with the local copy, control proceeds to step 258 where a determination is made as to whether the current slot identified by the current tag is free or available. In accordance with the embodiment described herein, this may be determined using the time stamp where a particular value may be placed in each time stamp field when a corresponding slot is returned to the pool of free or available slots. Any particular value may be used in an embodiment, such as a time stamp of 0, which may vary in accordance with each embodiment. If it is determined that the current slot is free, control proceeds to step 260 where an atomic operation may be performed. In one embodiment, this may be performed using an atomic "compare and swap" instruction which tests the L-bit and time stamp of the current tag to see if the values of either have changed since the determination at step 258. If the values have not changed, then the instruction also "swaps in" or updates values of the L-bit and time stamp fields by setting the L-bit to 1 and setting the time stamp to be that of the current time. It should be noted that this update of the current tag is performed to the copy in global memory. Additionally, the processing performed at step 260 is also performed using the copy from global memory.

Performing the compare and swap as an atomic, uninterrupted operation may be used to guarantee exclusive access to the shared resource of the cache or shared memory since, for example, multiple DAs may be attempting to access the same portion of shared memory, such as the same cache slot. The determination at step 258 may be performed, for example, by two different DAs reaching the same conclusion that a particular slot is available. However, only one of the DAs may actually be granted or obtain the slot since the atomic compare and swap operation may only be performed by one DA at a time in an uninterrupted fashion. The second DA's compare and swap will result in failure in that the values were changed by the first DA's successful execution of the compare and swap instruction.

The processing performed in connection with step 260 may be performed atomically using other instructions and/or techniques known to one of ordinary skill in the art, for example, in connection with accessing a shared resource such as the shared memory or cache as described herein. One example of the atomic performance or processing steps is the atomic "compare and swap" instruction which may be implemented in hardware and/or software. Another embodiment may utilize other techniques in performing an equivalent of this atomic operation by performing the following pseudo-code steps:

1. lock portion of shared resource
2. if L bit or time stamp has changed
   then FAIL and unlock shared resource
   else /*SUCCESS*/
       swap in new values as in step 260
       unlock shared resource The foregoing may be implemented used different mechanisms and techniques included in a system for providing exclusive access to a shared resource, such as the shared memory used as the cache in this instance.

It should be noted that the granularity used in connection with the lock and unlocking of a resource may vary in accordance with each particular embodiment. For example, in one embodiment, a locking mechanism may be provided which locks a minimum of a word size. Other embodiments may have other limitations. It may be desirable to lock for exclusive access the smallest amount or unit allowable within limits of a particular system which is also the size of a tag or portion thereof being accessed by multiple processors.

At step 262, a determination is made as to whether the compare and swap instruction succeeded. If so, control proceeds to step 264 where the located slot is returned as the one to be used. Otherwise control proceeds to step 270 where the L-bit is set in the local copy so that this slot is not examined again. The next tag is obtained in the current extent and the num_swap_fails is incremented by 1. Control proceeds to step 254.

Figure 11:
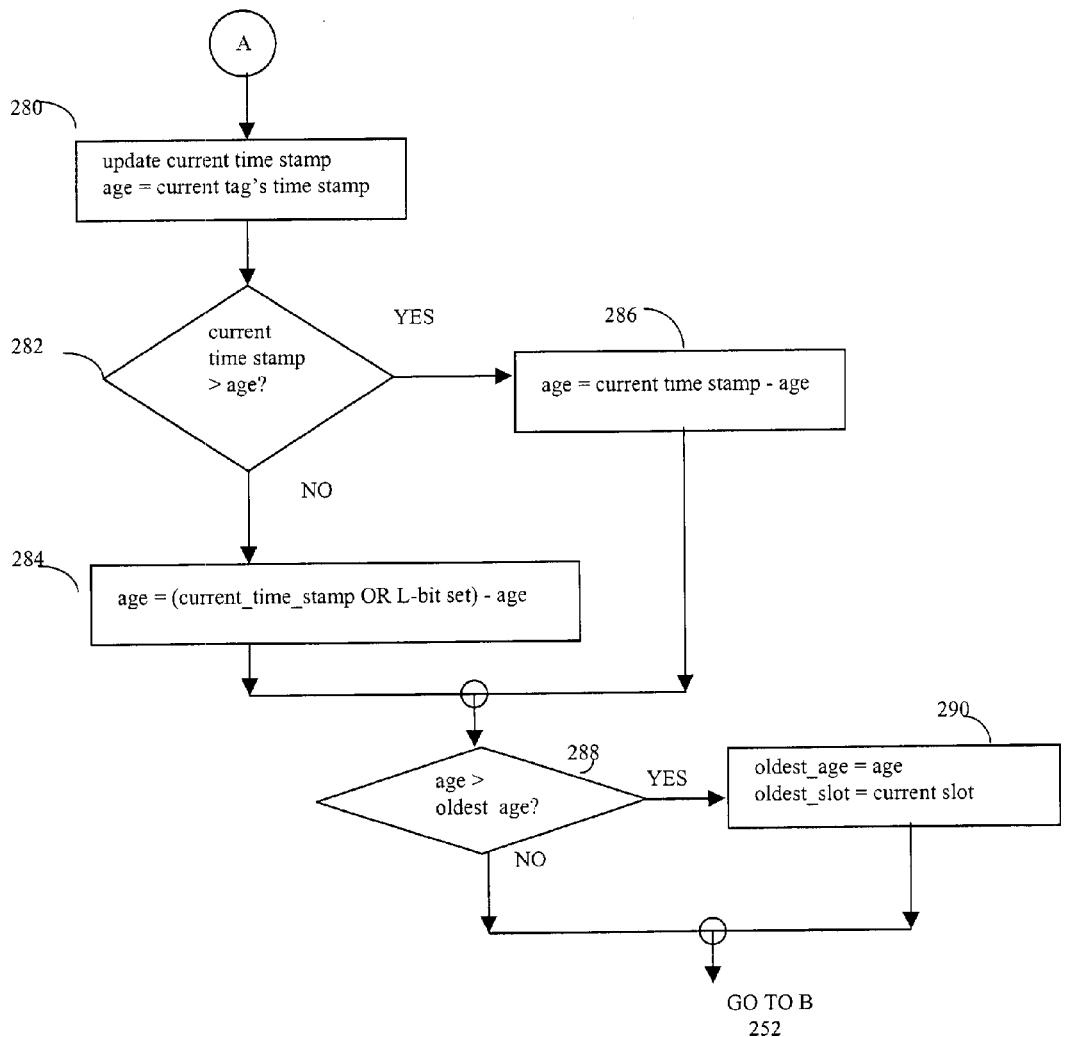

If a determination is made at step 258 that the current tag is not free, control proceeds to step 280 which is continued in FIG. 11. At step 280, the current time stamp is updated and the temporary variable age is assigned the current tag's time stamp value. It should be noted that the processing step of updating the current time stamp may be performed in any one of a variety of different increment units. For example, in one embodiment, current time stamp may be updated in increments of 4 units. In this example, multiple processors may be using the same cache in which each of the processors has its own clock and associated time used in connection with time stamps. Each of the processor clocks may have time synchronization differences such that at a particular point in time, time stamps produced by any two of the clocks may differ. A time stamp increment, such as 4 units, may be selected in accordance with any such synchronization differences when comparing or using time stamp values as in processing herein. In one embodiment, the increment is 4 units=2 seconds, each unit being ½ second. This increment amount may vary in accordance with embodiment.

At step 282, a determination is made as to whether the current time stamp is greater than the age. If so, control proceeds to step 286 where age=current time stamp−age. Otherwise, control proceeds to step 284 where age=(current time stamp OR L-bit set)−age.

The processing at steps 282, and 286 obtain an absolute value of the age of the current slot which is a difference of the amount of time from when the slot was last used subtracted from the current time. The processing of steps 282, 284 and 286 are used in connection with handling time stamp values which "wrap around" for very large values causing the L-bit to be set. When this point is reached, the age starts over at a new value similar to a counter which, when its maximum is reached, is reset.

Control proceeds to step 288 where a determination is made as to whether the age of the current slot is greater than the oldest_age of the slots visited thus far. If so, control proceeds to step 290 where information is retained about the current slot, such as updating the oldest_age and the corresponding identifier. Control then proceeds to step 252.

As data associated with a slot is moved in and out of cache, the cache index or directory, for example as illustrated in FIG. 5, may accordingly be updated.

It should be noted that in the foregoing embodiment using tags for cache management, a particular slot may be noted as "not available" is the L-bit is set (=1) in a global copy. A cache slot which is "not available" may be characterized as one that includes volatile data and should not be removed from the cache. Use of the L-bit as a technique for indicating when a slot is not available may be used to manage a shared cache, for example, rather than an using a cache implementation with linked lists and pointers as described elsewhere herein. Similarly, a slot may be indicated as "available" by clearing (=0) the L-bit. The associated time stamp may be set to any one of different values affecting when a particular slot may be selected for use. For example, the time stamp may be set to a value of 0 indicating that the data in the cache slot is invalid.

Adjusting the time stamp to different times may be used when freeing a cache slot, such as, for example, when setting the L-bit to 0. The time stamp may be set to a particular value to indicate an age of a slot. As described elsewhere herein, clearing the L-bit and resetting the time stamp to 0 in a global memory copy of a tag may be used to indicate that this slot should be selected prior to others having non-zero time stamps. A time stamp of zero in this instance may be used to indicate that the cache slot contains meaningless data. A non-zero time stamp may also affect when a particular cache slot is selected, for example, since the "oldest" cache slot may be selected from all time slots having non-zero time stamps. It should be noted that in a cache slot with an L-bit=0, a non-zero time stamp may be used to indicate that although the slot is "available", the slot does contain valid data that may also be used, for example, in connection with a write pending data portion that has been written out to disk and subsequently for some time the data still remains in the cache. Accordingly adjusting the time stamp may cause the age determination of the associated slot to vary. This technique may be used in connection with causing data in particular slots to remain in the cache for longer or shorter periods of time. This time stamp adjustment may be used, for example, as an alternative to physically inserting a slot at different points in a cache data structure, for example, such as in adjusting pointers in a linked list. Depending on techniques and policies that may be included in each embodiment, it may be desirable to have slots of data having particular characteristics remain in cache longer than other slots having other characteristics.

In particular, an embodiment may adjust the time stamp value of an associated slot in accordance with the Fall Through Time (FTT). Generally, the FTT refers to the average amount of time it takes for an unpromoted slot once it is in the queue to exit the queue. In other words, it is the average amount of time it takes a slot to pass through or "fall" through the queue from the head position and then exit out of the queue through the tail position, for example, referencing the illustration of FIG. 4. A slot may be added to the head position or at another position in accordance with the relative time stamps of those in the queue. The FTT is described in issued U.S. Pat. No. 5,592,432, Vishlitzky et al, which is incorporated herein by reference.

The FTT may be calculated for each slot by taking a first time stamp at the position when an element is lastly placed at the head of the replacement queue, and then taking a second time stamp value when that same slot exits the replacement queue (such as when a slot exits or leaves at the tail). The difference between the second ending time stamp value and the starting or first time stamp value for each particular slot may be used in calculating an average amount of time. It is this average amount of time that represents the FTT for a large number of slots.

It should be noted that in one embodiment of the foregoing, it was determined that the tags within each extent approximates a uniform distribution with respect to the time stamps.

An embodiment may provide different initial values for use with techniques described herein with different processors, for example, such as may be associated with a DA or other director. For example, in one embodiment, when determining the starting extent, each processor may begin with the first extent of a different memory bank. As additional extents are requested by each processor, a next subsequent extent may be obtained by updating the extent pointer address by an increment value also unique for each processor. For example, in one embodiment, each processor may have its own unique extent increment value and all the extent increments of all the processors may also be relatively prime. Additionally, the number of extents may not be a multiple of any prime number that is an increment extent value. The foregoing and other techniques may be used in an embodiment to minimize clustering of different processors in which different processors are attempting to obtain cache slots which are clustered together.

In one embodiment, each director or processor may have its own unique processor identifier number. This identifier number may be used in assigning an initial value for a starting extent for each processor. For example, each processor may be assigned an initial value of a starting extent number as follows:

for I=1 to max for all processors
{
   current_proc_id=identifier of processor I;
   initial_extent_value_processor pointer[I]=(number of extents in all banks*current_proc_id)/(max number of processors)
   I=I+1
} where I is an index over the range of all processors and each processor has an associated unique processor identifier. The initial value of a starting extent for each processor is selected in accordance with the unique processor identifier. In this embodiment, the memory may be organized into banks and number of extents in all banks refers to the total number of extents in all of the memory banks. As described elsewhere herein, each memory bank may include a particular number of extents that may vary in accordance with each embodiment. Another embodiment may use the processor identifier in connection with determining a random number used in selecting an initial value for each processor's starting extent.

In addition to selecting an initial value of a starting extent for each processor, an extent increment may be determined for how to select the next extent for each processor. In one embodiment, this increment may be the next sequential extent for each processor, for example, determined by adding a constant of one (1) to a current extent number. Other embodiments may use different techniques in determining the initial value of a starting extent and for an extent increment.

An embodiment may also utilize thresholds levels of available slots such that there is a minimum number of available slots. For example, in one embodiment, when the number of available slots (L-bit=0) falls below 20%, write pending operations are actually written to disk causing the associated cache slots to have the L-bit values cleared.

An embodiment may also use the foregoing cache management technique in a system which provides for also utilizing an alternate technique for cache management. This may be implemented, for example, utilizing a switch providing for selection of the foregoing technique or another, such as cache management using pointer manipulation.

The foregoing provides a flexible and efficient technique for cache management. Slots may be added or removed from the cache by updating values in an associated tag. Other embodiments may utilize pointer management techniques in accordance with particular data structure of the associate cache that may be more expensive in terms of execution time and memory. Exclusive access to the shared resource of the cache may be implemented utilizing the atomic instruction described herein or other equivalent. This may be used as alternative for a more expensive locking mechanism, for example, that may exclude all others from accessing any portion of the cache. It should be noted that the atomic instruction does not exclude all other from accessing the cache but rather guarantees performance of an atomic operation to a portion of the cache. Use of the foregoing techniques described herein may be more apparent in a system, for example, having a large number of processors accessing the shared memory, or those with a slow global memory access time.

It should be noted that the foregoing includes techniques used in connection with a portion of shared memory used as a cache. These techniques may also be used in connection with other types of shared resources.

Techniques used in connection with cache management such as cache replacement and slot promotion policies may vary in accordance with the type of cache. Caches may be characterized in accordance with location and use in a computer system. Caches located in different portions of a computer system may have different access patterns resulting in different policies proving more efficient in accordance with the type of cache.

A first type of cache may be characterized as a first level buffer cache and a second type of cache may be characterized as a second level buffer cache. Accesses to a second level buffer cache may be characterized as misses from a first level buffer cache in a computer system. Second level buffer caches may have different access patterns. These different levels of buffer caches are described in more detail in following paragraphs.

Figure 13:
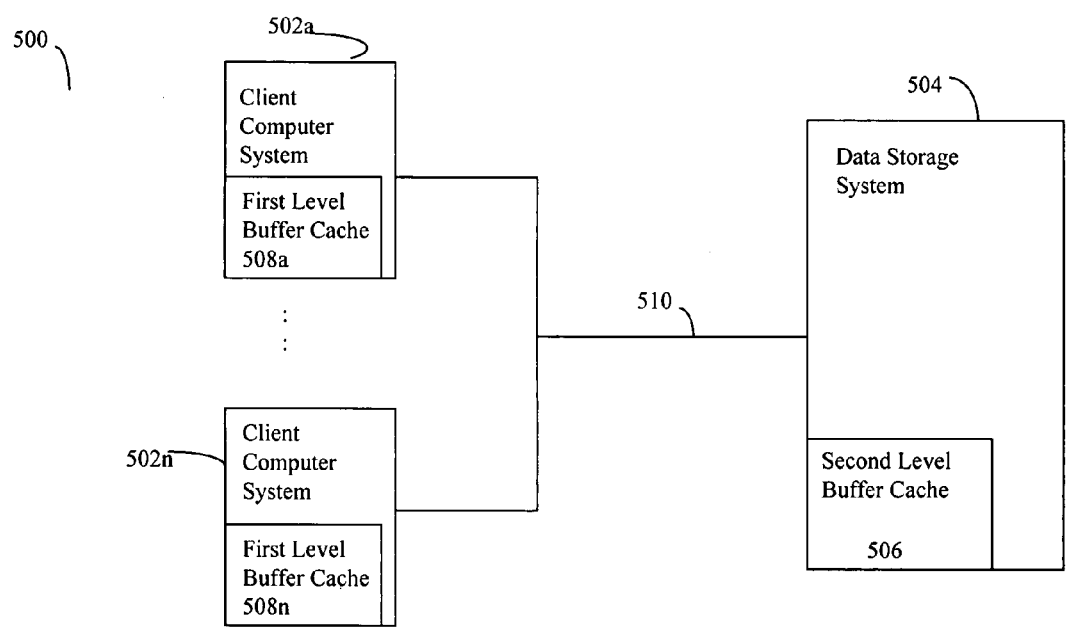
FIGS. 13 and 14 are examples of embodiments of secondary level buffer caching arrangements.

Referring now to FIG. 13, shown is an example of an embodiment of a computer system 500. The elements of the computer system 500 may be similar to those described previously in connection with FIGS. 1 and 2, for example. The computer system 500 in this example includes client computer systems 502a–502n. Each of the client systems 502a–502n may include, respectively, a first level buffer cache 508a–508n. Each of the client systems 502a–502n may communicate with the data storage system 504 over a communication connection and medium 510, such as a network or other communication medium described elsewhere herein.

The data storage system 504 may include a cache 506. The cache 506 may be referred to as a second level buffer cache. A client, such as 502a, may request data in connection with an I/O operation. The data may be stored locally within the cache 508a. If the data being requested is not in the local cache 508a, the client 502a may communicate with storage system 504 over communications medium 510 to request the data. The data storage system 504 may then look into its cache 506 for the requested data. An access to the cache 506 within the data storage system 504 is actually a cache "miss" to the first level buffer cache 508 included within the computer system of the client 502a.

Figure 14:
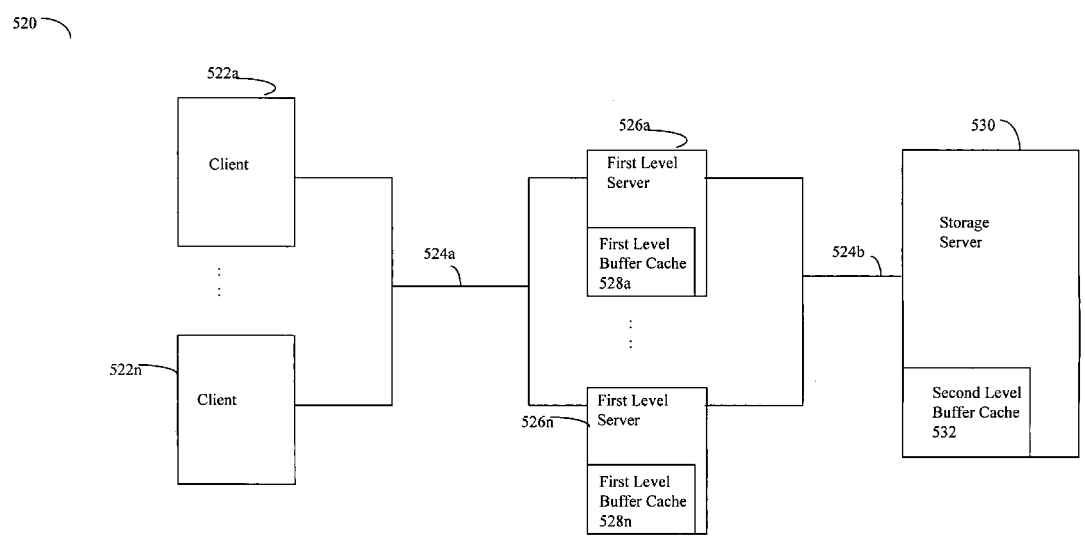

Referring now to FIG. 14, shown is another example of an embodiment of a computer system 520 that also includes first and second level buffer caches. The computer system 520 includes clients 522a–522n which communicate through communications medium 524a with a first level of servers 526a–526n. In this example, rather than store a first level cache of data locally within each of the clients, the first level of caching is included in the first level of the servers 526a–526n. The caches 528a–528n may be referred to as first level buffer caches. Servers 526a–526n may communicate over a communications medium 524b with the storage server 530 that includes a cache 532. The cache 532 may, in this instance, be referred to as the second level buffer cache.

The topology shown in the computer system embodiment 520 may exist, for example, with first level servers 526a–526n, such as database servers, that communicate with a second level server 530, such as a storage servers. The application executing within such a computer system embodiment may cause particular caching access patterns within first and second level buffer caches.

It should be noted that the computer systems 500 and 520 are two examples of embodiments of computer systems that may implement a first and second level buffer cache hierarchy. This may also be referred to as a multi-level caching hierarchy.

One point to note for both these examples having first and second level buffer caches is that the second level buffer cache may have different access patterns from the first level buffer cache since accesses to a second level buffer cache are actually first level buffer cache "misses". First level buffer caches may employ, for example, policies such as an LRU replacement policy such that the recently accessed blocks remain in the cache. However, employing the same technique within the second level buffer cache, such as a 532, may result in poor performance. Thus, it may be desirable to employ a different technique within a secondary level buffer cache such as may be included in a data storage system.

It should be noted that the techniques that will be described in following paragraphs for use in a second level buffer cache may be employed in an embodiment using any one of a variety of different data structures to represent the cache. For example, the techniques described herein for cache management may be used in a cache system employing a data structure for example, as described in connection with the data structure 60 of FIG. 3, the data structure 70 of FIG. 4, as well as the data structure representing a cache described in FIGS. 6, 7 and 8. Modifications to steps that will be described in following paragraphs may be made as an implementation detail in accordance with implementing the techniques described herein in accordance with the particular data structure selected in a particular embodiment for each cache. It should also be noted that other levels of a multi-level cache hierarchy, besides the second level described herein, may employ the techniques described herein.

Within a particular cache such as may be included in a data storage system, tracks stored within the cache, such as one track per cache slot, may be referenced only once while others may be referenced or hit numerous times. The techniques that will be described in following paragraphs provides a way of putting a track on "parole" to wait for the second hit. If the same cache slot receives a subsequent second hit, the cache slot will be given a longer period of time within the cache queue. This technique that will be described in following paragraphs is in contrast, for example, to other techniques that may weight and promote tracks within the cache the same regardless of whether they were hit a single time or multiple times. In other words, the techniques described in following paragraphs distinguish between two types of cache hits where the first type of cache hit are those cache slots called or hit only once as opposed to a second type of cache hit which is a subsequent cache hit to the same slot which has already been referred to or hit once. A backup application may be an example of an application that references particular blocks and tracks only once in connection with performing a backup operation.

Figure 15:
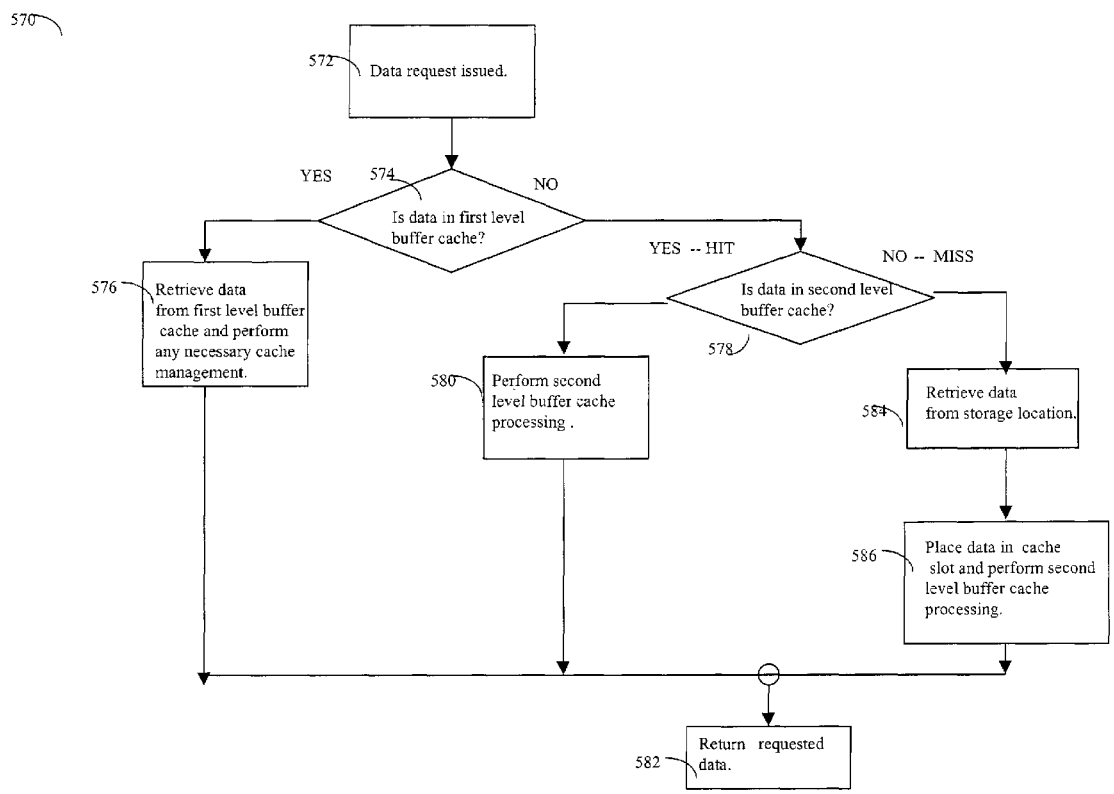
FIG. 15 is a flowchart of steps of a method for processing a data request within an embodiment having first and second level buffer caching.

Referring now to FIG. 15, shown is a flowchart 570 of steps of one embodiment that may be performed in connection with obtaining data for servicing a data request in a computer system having first and second level buffer caching. At step 572, a data request is issued, for example, by one of the host or client systems. Control proceeds to step 574 where it is determined if data is in the first level buffer cache. If it is determined that step 574 that data is in the first level buffer cache, control proceeds to step 576 where data is retrieved from the first level buffer cache and any necessary first level buffer cache management is performed. Control proceeds to step 582 where the requested data is returned.

If at step 574 it is determined that data is not within the first level buffer cache, control proceeds to step 578 where it is determined if data is within the second level buffer cache. If so, control proceeds to step 580 where second level buffer cache processing in accordance with this hit is performed. Subsequently, control proceeds to step 582 where the data that is request is returned.

If at step 578 it is determined that data is not within the second level buffer cache, control proceeds to step 584 in accordance with a second level buffer cache miss. At step 584, data is retrieved from the appropriate storage location, for example, as may be included within the data storage system on a device. Control proceeds to step 586 where data may then be placed in a cache slot included in the second level buffer cache. Any second level buffer cache processing may also be performed at step 586. Control proceeds to step 582 where the data that has been requested is returned.

It should be noted that the processing steps described in connection with flowchart 570 are general processing steps in connection with a first and second level buffer caching scheme. What will now be described are more detailed processing in connection with steps 580 and 586 for performing second level buffer cache processing and management.

Figure 16:
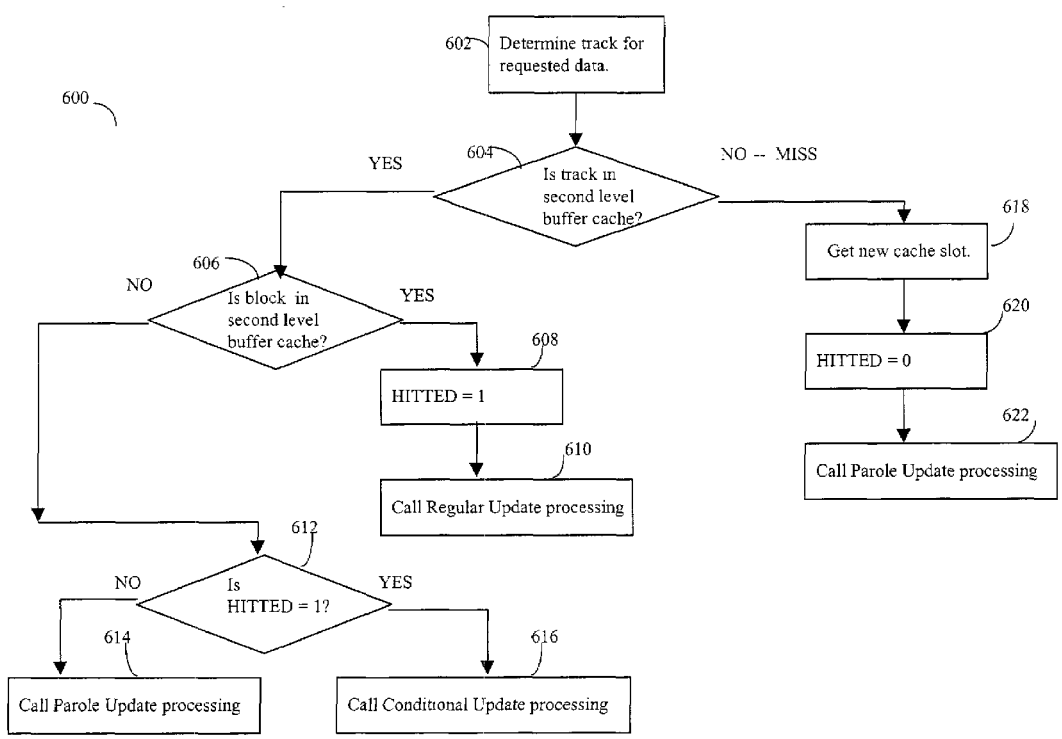
FIGS. 16 and 17 are flowcharts of more detailed processing steps for processing a data request within an embodiment having first and second level buffer caching in an embodiment using a tag-based caching arrangement for the second level caching.

Referring now to FIG. 16, shown is a flowchart 600 of processing steps that may be performed in an embodiment of a computer system in connection with processing for second level buffer caching as may be included, for example, in a data storage system. The steps described in this flowchart refer to a particular embodiment that includes the tag-based cache (TBC) arrangement also described herein. However, the techniques and principles may be applied to other type of cache arrangements.

At step 602, the particular track or tracks in accordance with the requested data is determined. It should be noted that the processing of flowchart 600 may be performed multiple times in accordance with a single data request for each particular track. At step 604, a determination is made as to whether data associated with a particular track is included within the second level buffer cache.

If at step 604 it is determined that data per the particular track being requested is not within the second level buffer cache, control proceeds to step 618 where a new cache slot is obtained. Obtaining and determining a new cache slot, for example where there are no free slots, may be in accordance with each particular embodiment and the policies implemented within a particular cache included in that embodiment. For example, in connection with a TBC arrangement, when there are no free slots, a particular slot may be located using techniques, for example, described in connection with flowchart 250 of FIG. 10 where the oldest slot is displaced from the queue or cache in accordance with a replacement policy.

Subsequently, control proceeds to step 620 where a variable called HITTED is set to zero. In this particular embodiment, HITTED may be represented as a binary or boolean variable having two states, such as zero and one. A state of HITTED=1 may indicate that some block within the particular track has been hit more than one time. In this particular embodiment, a track may include a plurality of blocks. Any number of tracks within that block may be in the cache. If any particular block is requested within that track more than one time and there has been a cache hit while this particular block is in the cache, HITTED has a value of one. HITTED has a value of zero otherwise.

Each cache slot in a TBC may include an invalid block vector. In one embodiment, this may be a bit vector having an entry for each block in the associated track of the cache slot. A value of 1 in the bit vector may indicate that the block corresponding to the bit vector entry is in the cache. Otherwise, the bit vector entry may be zero. In one embodiment, the invalid block vector may be included at a particular location within each cache slot. Other embodiments may store this information using other data structures and in other locations.

Also included in an embodiment using the TBC may be a flag called HITTED. This flag may be stored with other information about a particular slot. In one embodiment, there may be one HITTED flag for each cache slot. The one or more HITTED flags for each cache slot may be included in the control slot, such as 104a described elsewhere herein. In one embodiment, the HITTED flag may be a bit used from the timestamp portion of the tag 112a of FIG. 8. This may provide an advantage of obtaining the HITTED flag without accessing another portion of the cache or other location. An embodiment may also include the HITTED flag in a portion of each cache slot or other location that may vary with each embodiment.

After the variable HITTED is initialized or set to zero in accordance with the new cache slot allocated for the current track, control proceeds to step 622 where parole update processing is performed. In one embodiment, parole update processing may move the current cache slot to the midway or halfway point of the cache. Using timestamps, the timestamp of the new slot may be initialized as: current timestamp−½ FTT. Other embodiments may select to position the new slot at other points within the cache.

At step 604, if a determination is made that the track is within the second level buffer cache, control proceeds to step 606 where a further determination is made as to whether a particular block of the track being requested is within the second level buffer cache. An embodiment may use the invalid block vector, for example, in making this determination. If so, control proceeds to step 608 where HITTED is then set to one to indicate that there is a second hit and the block is currently in cache.

Control proceeds to step 610 where regular update processing is performed. In one embodiment, regular update processing may, for example, move the current cache slot to the top or beginning of the data structure cache queue such that it will now be the last choice for displacement. In other words, regular update processing may be performed in accordance with the particular policy or cache management technique implemented within a particular embodiment. Other types of processing may be performed in accordance with a particular policy of a selected embodiment.

If at step 606 it is determined that the block is not within the second level buffer cache, control proceeds to step 612, where a further determination is made as to whether the variable HITTED associated with the current track's cache slot is =1. If HITTED=1, control proceeds to step 616 where a conditional update processing is performed. More detailed processing steps associated with conditional update processing are described elsewhere herein. Otherwise, at step 612, if HITTED is not=1, control proceeds to step 614 where parole update processing may be performed. The processing at step 614 is similar to the processing performed at step 622 described elsewhere herein.

It should be noted that parole update processing for example, as described in connection with steps 614 and 622, may logically move or reposition a cache slot to a different position within a cache by adjusting the timestamp, for example, in the TBC arrangement described elsewhere herein. Recall, for example, in connection a logical representation of FIG. 4, that the head of the queue may be characterized as the youngest cache slot. By accordingly selecting a timestamp value in accordance with the amount of time it takes for a cache slot to progress from the head to the tail of the queue, the amount of time a cache slot remains in the queue is affected.

Figure 17:
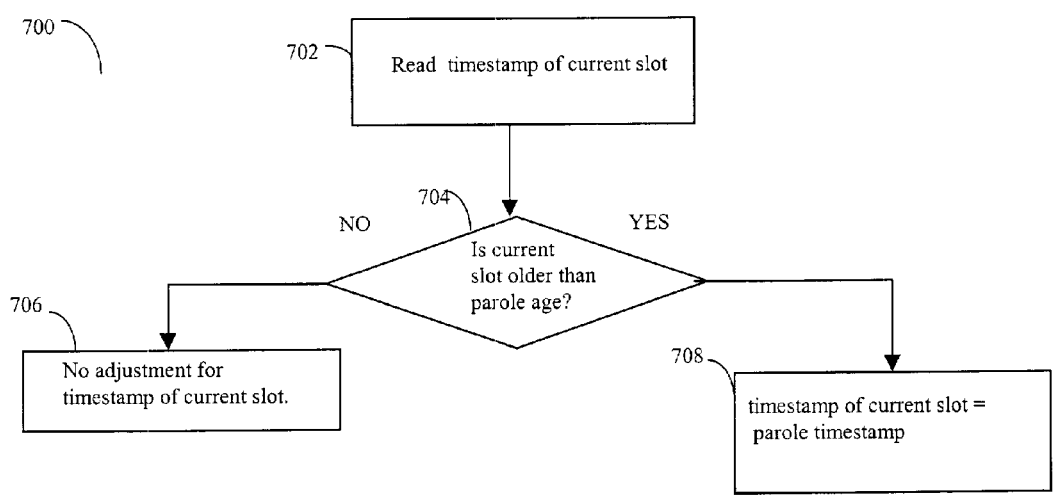

Referring now to FIG. 17, shown are processing steps of a flowchart 700 that may be included in one embodiment for performing the conditional update processing as described in connection with step 616 of FIG. 16. At step 702, the timestamp of the current slot is read. At step 704, a determination is made as to whether the current slot is older than the parole age. The parole age may be indicated by the parole time stamp value. The determination may be made by comparing the timestamp of the current slot to the parole time stamp value. In one embodiment, the parole timestamp may be: the current timestamp−½ FTT. Other embodiments may select a parole timestamp as a threshold value in that may vary accordance with each particular embodiment.

If, at step 704, a determination is made that the timestamp of the current slot is less than the parole timestamp indicating that the current slot is older than the parole time stamp, control proceeds to step 708 where the timestamp of the current slot is updated to be the parole timestamp value, such as current timestamp−½ FTT. Otherwise, at step 704, if the timestamp of the current slot is not less than the parole timestamp, control proceeds from step 704 to step 706 where there is no adjustment made to the timestamp of the current slot.

The foregoing ensures that the current slot is at least at a particular threshold point in the cache in which the threshold hold point is indicated by the parole timestamp. The threshold point relates to how long an element typically remains in the cache.

What will now be described are flowcharts that may be used in connection with an embodiment utilizing a linked list cache structure, for example, forming a circular structure described elsewhere herein. In particular, a second chance flag may be used as described in following paragraphs as an alternative to the HITTED flag described in connection with the TBC above.

Figure 18:
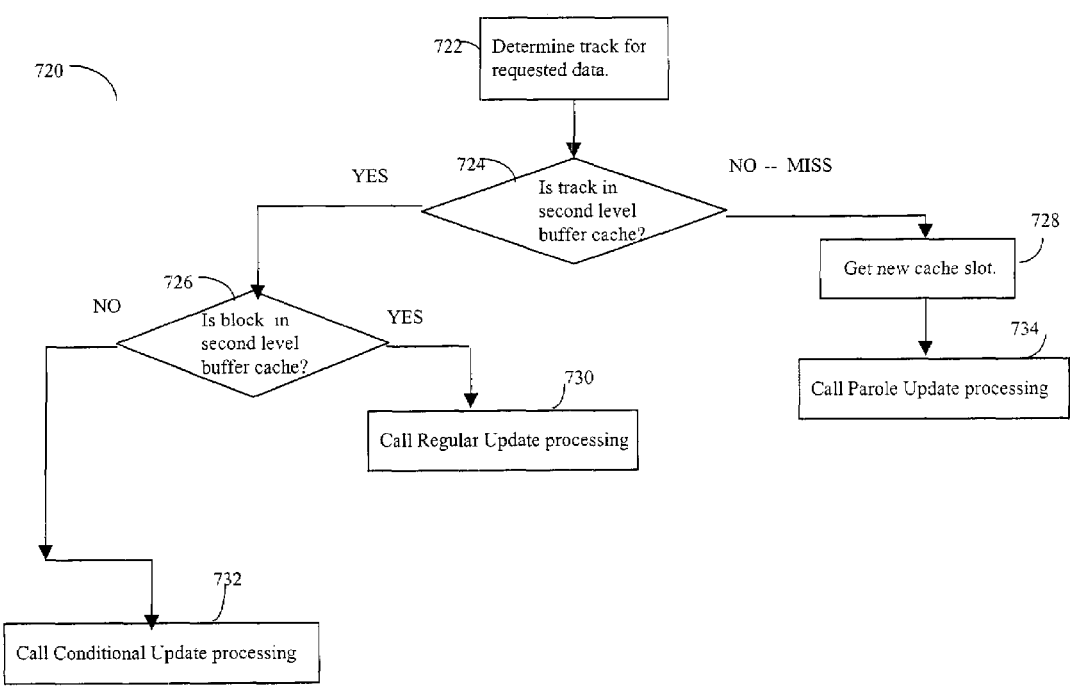
FIGS. 18 and 19 are flowcharts of more detailed processing steps for processing a data request within an embodiment having first and second level buffer caching in an embodiment using a linked list queue data structure for the second level caching.

Referring now to FIG. 18, shown is a flowchart 720 of steps of a method for performing second level buffer caching in an embodiment using a second chance flag with a cache structure implemented as a circular linked list. It should be noted that the processing steps of flowchart 720 may be performed multiple times for a single request in accordance with the number of tracks associated with the request. The steps of flowchart 720 may be used as alternative to processing steps described in connection with flowchart 600. At step 722, the track for the requested data is determined. At step 724, a determination is made as to whether the track requested is in the second level buffer cache. If it is determined that the requested track is not within the second level buffer cache, control proceeds to step 728 to obtain a new cache slot.

As part of the get new cache slot processing of step 728 in this embodiment, the second chance flag may be used in determining which slot to displace in the event there are no currently free slots. As described elsewhere herein, the get new cache slot processing may obtain the first free slot, or displace the oldest slot having the second chance flag=0. The newly allocated cache slot may then have its second chance flag initialized to 0. A cache may implemented as a queue using the ring-like structure with a linked list, for example as described previously in connection with the data structure 60 of FIG. 3, using cache management techniques described in U.S. Pat. No. 5,381,539, which is incorporated by reference herein.

Control proceeds to step 734 where parole update processing may be performed. In this example, the parole update processing may place the current slot at the top of the queue cache structure (the head of the list) by, for example, manipulating pointers to place the slot at this particular position with the linked list queue structure.

If, at step 724, it is determined that the track is currently in the cache, control proceeds to step 726 where a determination is made as to whether the block being of the track requested is located in the cache. This determination may be performed using an invalid block bit vector, for example, described elsewhere herein in connection with the TBC embodiment. At step 726, if a determination is made that the block being requested is currently in the cache, control proceeds to step 730 where regular update processing may be performed. As described elsewhere herein, regular update processing may be updating of the cache in accordance with a currently implemented cache policy. For example, in one embodiment, as part of normal update processing, the current cache slot may be moved to the head or top of the queue making it the youngest queue element. Additionally, the second chance flag may be set to 1. Other embodiments may move the current cache slot to other positions within the cache in accordance with other policies. If, at step 726, it is determined that the current block is not in the cache, control proceeds to step 732 where conditional update processing is performed.

Figure 19:
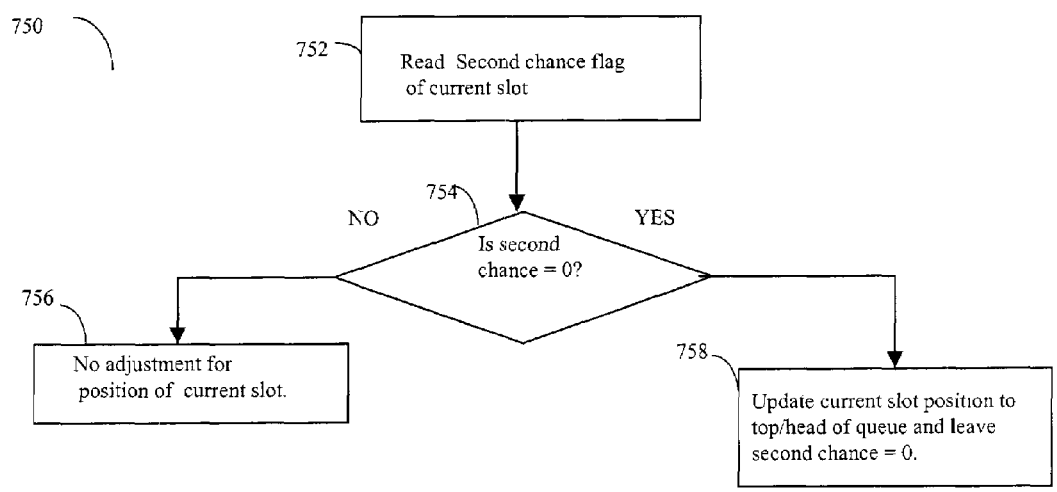

Referring now to FIG. 19, shown are processing steps that may be performed in connection with conditional update processing in an embodiment that includes use of a second chance flag rather than a bit value flag HITTED. In other words, the processing steps of flowchart 750 of FIG. 19 may be used in an embodiment as an alternative to the processing steps of flowchart 700 of FIG. 17 in connection with performing conditional update processing in an embodiment that includes, for example, the linked list structure 60 of FIG. 3.

In the linked list arrangement also described herein, each particular cache slot may have associated with it a second chance flag having a value of zero or one. The second chance flag may be set initially to zero when a slot is allocated and initialized. Subsequently, the second chance flag may be set to one as part of normal update processing when a cache hit occurs to the particular slot. In connection with determining a free slot and deciding which cache slot to displace, as in step 618 processing, a slot having a second chance flag=1 may be passed over and not displaced. Rather, when searching for a slot to displace, if a cache slot has the second chance=1, the second chance flag of the current slot is set to 0 and the search continues for a slot which has second chance flag=0. An embodiment may have a second chance flag associated with each cache slot. In one embodiment, the second chance flag may be included as a flag bit located within each cache slot. The second chance flag may be included in other locations that vary in accordance with each embodiment.

At step 752, the second chance flag of the current cache slot is read. At step 754, a determination is made as to whether the second chance flag is zero. If so, control proceeds to step 758 where the current slot position is updated to the head of the queue, such as by pointer modification. An embodiment may also select to move the current cache slot to another position within the cache, such as to the middle of the queue cache structure. At step 754, if it is determined that the second chance flag is not equal to zero, control proceeds to step 756 where there is no adjustment made for the position of the current slot within the cache.

What has just been described is a processing step that may be performed in connection with second level buffer caching techniques. In particular, the position of the cache slot may be updated in accordance with whether a cache slot is hit once, or more than once.

It should be noted that in connection with techniques described herein, the cache structure may be managed using a locking technique which locks the entire cache data structure, or a portion thereof, when multiple processes may be simultaneously performing reading and writing operations of the shared resource, the cache. A locking mechanism that may be included in an embodiment having such multiple processes may be used to enforce an exclusive access policy of the shared cache resource. For example, the locking mechanism may ensure that only one process may access and manipulate the entire queue or cache data structure at a particular time. When there are multiple processors executing multiple processes that need to access the cache, this global exclusive access policy may become a bottleneck. Alternatively, other locking techniques may be used that may vary with each embodiment. For example, an embodiment may utilize the atomic instruction technique, or equivalent thereof, as described elsewhere herein in connection with the tag-based cache.

Different locking mechanisms may be used in an embodiment depending on the type of cache or queue data structure as well as the functionality included in, for example, the operating system and other hardware and/or software of a particular embodiment. Other embodiments may include other functionality, such as use of semaphores or mutual exclusive or protected sections, for enforcing an exclusive access to a shared resource policy when writing or modifying the shared cache resource.

An embodiment may select different values used herein, such as parole time stamp values. These values may be determined in accordance with tuning a system for its particular performance.

As described herein, conditional update processing may be performed on cache slots which have more than one cache hit. Accordingly, on these slots, if the slot is within a particular bottom portion of the queue indicating that the current cache slot may be displaced within some threshold time period, the cache slot may be promoted or updated to remain in the queue longer. Otherwise, if the slot is not within a threshold portion of the queue (some bottom portion), there is a determination that promotion of the current slot is not performed.

Figure 20:
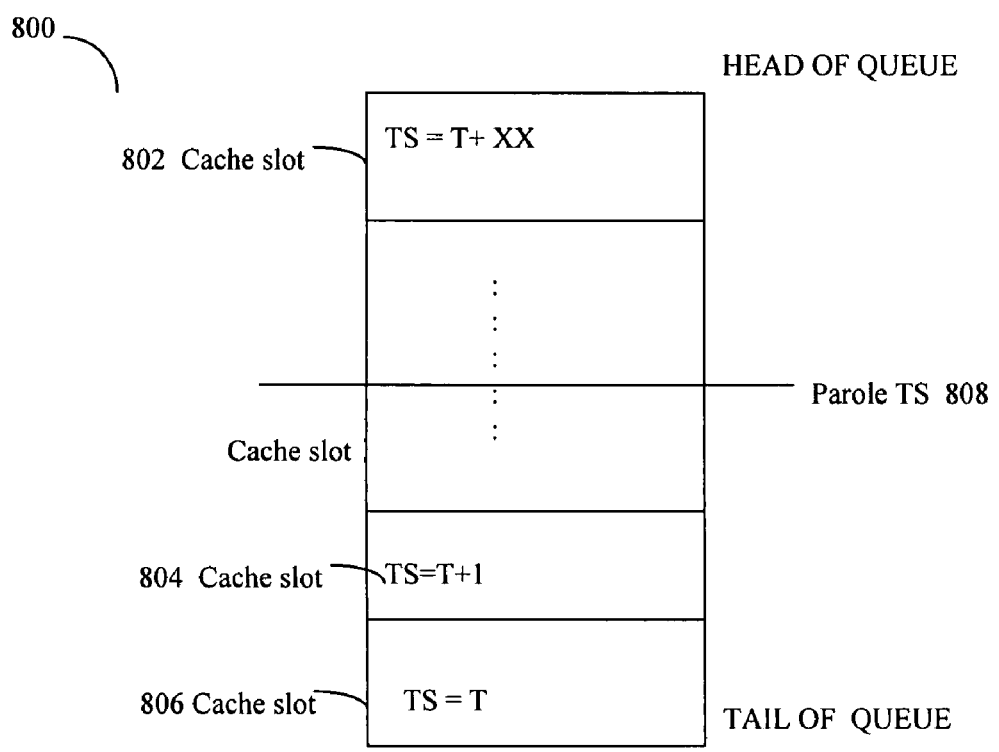
FIG. 20 is an example illustrating the use of a parole timestamp in connection with a cache data structure.

Referring now to FIG. 20, shown is an example 800 of an embodiment of a logical representation of a queue data structure. This may be a logical representation of a cache data structure included in an embodiment. In this example, the TAIL of the queue has a time stamp value (TS) of T. When a new slot is needed and all cache entries are taken, a free slot may be obtained in one embodiment by selecting the element at the TAIL of the logical queue denoting the oldest timestamp, for example. The element at the TAIL of the queue is displaced and a associated with a new portion of data inserted into the queue. The new entry may be inserted into the queue, for example, by placing it at the HEAD of the queue. Other cache slots corresponding to other queue entries moving from the TAIL to the HEAD have increasing TS values indicating that these are younger entries. A parole TS value 808 may be selected corresponding to a particular threshold level of the queue in accordance with the FTT associated with the queue. For example, if it is determined that an element within the queue that has multiple cache hits is within a predetermined portion of the queue or cache, such as the bottom ⅓ or ½ of the queue, this cache slot may be promoted within the cache by moving the cache slot, for example, to the HEAD position in the queue.

The foregoing of FIG. 20 may also represent a cache implemented using a circular linked list data structure as described elsewhere herein in more detail. Cache slots may be positioned at various points within the cache through pointer manipulation rather than timestamp adjustment.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for cache management of a cache comprising:
   determining whether a current request for requested data is associated with a cache slot currently in said cache;
   in response to determining that said current request is not associated with a cache slot currently in said cache, positioning a cache slot associated with said requested data to a first position in the cache;
   determining whether said requested data is in the cache;
   if said requested data is not in the cache and said requested data is associated with a cache slot currently in the cache, and if there has been more than one previous cache hit for the cache slot, performing processing to determine if the cache slot is to be promoted to a second position in the cache causing said cache slot to remain in the cache for a longer period of time than the cache slot otherwise remains without a cache promotion, wherein said second position causes said cache slot to remain in said cache at least as long as if said cache slot is at said first position; and if said requested data is in the cache and said requested data is associated with a cache slot currently in the cache, positioning said cache slot to a third position within the cache wherein said third position causes said cache slot to remain in said cache as least as long as if said cache slot is at said second position.

2. The method of claim 1, wherein said cache is included in a second level buffer cache.

3. The method of claim 2, wherein said cache is included in a data storage system of said computer system.

4. The method of claim 2, wherein said first position of said cache slot is a middle position within said cache indicating an age of said cache slot relative to other cache slots.

5. The method of claim 4, wherein said third position of said cache slot is at the head of the cache indicating that said cache slot is a youngest cache slot.

6. The method of claim 5, wherein, when said cache slot is positioned at said third position, a flag associated with said cache slot is set to indicate a cache hit for a portion of data associated with said cache slot that is included in the cache; and when said cache slot is positioned to said first position, initializing said flag to zero.

7. The method of claim 6, wherein, when positioning said cache slot at said second position, a determination is made as to whether said flag is set.

8. The method of claim 7, further comprising:

if said flag is set, positioning said cache slot at a second position which is said middle position of said cache if said second position of said cache slot causes said cache slot to remain in said cache longer than a current position of said cache slot.

9. The method of claim 8, further comprising:

if said flag is not set, unconditionally positioning said cache slot at a second position which is said middle position of said cache.

10. The method of claim 2, wherein said first position of said cache slot is at a head of said cache indicating that said cache slot is a youngest cache slot and a flag associated with said cache slot is initialized to zero.

11. The method of claim 10, wherein said third position of said cache slot is at a head of said cache indicating that said cache slot is a youngest cache slot and a flag associated with said cache slot is set to one.

12. The method of claim 11, wherein said second position is a current position of said cache slot if said flag associated with said cache slot is one, and said second position is a head of said cache indicating that said cache slot is a youngest cache slot otherwise.

13. The method of claim 12, further comprising:

obtaining an available cache slot, wherein, upon determining that there are no available cache slots, displacing a cache slot having a flag equal to zero.

14. The method of claim 13, wherein, upon examining a cache slot to determine if a slot is available, setting the flag associated with said cache slot to zero if said flag is set to one.

15. The method of claim 14, wherein a track of a storage device comprising a plurality of data blocks is associated with said cache slot, and said requested data is for one of said plurality of data blocks associated with said cache slot.

16. The method of claim 15, wherein an invalid block vector is associated with said cache slot indicating which of said plurality of data blocks associated with said track are included in said cache.

17. The method of claim 9, wherein a track of a storage device comprising a plurality of data blocks is associated with said cache slot, said requested data is for one of said plurality of data blocks associated with said cache slot.

18. The method of claim 17, wherein an invalid block vector is associated with said cache slot indicating which of said plurality of data blocks associated with said track are included in said cache.

19. A computer program product for cache management of a cache, said computer program product including a computer readable storage medium comprising machine executable code stored thereon, said computer readable storage medium comprising:

machine executable code that determines whether a current request for requested data is associated with a cache slot currently in said cache;

machine executable code that positions a cache slot associated with said requested data, when said current request is not associated with a cache slot currently in said cache, to a first position in the cache;

machine executable code that determines whether said requested data is in the cache;

machine executable code that, if said requested data is not in the cache and said requested data is associated with a cache slot currently in the cache, and if there has been more than one previous cache hit for the cache slot, performs processing to determine if the cache slot is to be promoted to a second position in the cache causing said cache slot to remain in the cache for a longer period of time than the cache slot otherwise remains without a cache promotion, wherein said second position causes said cache slot to remain in said cache at least as long as if said cache slot is at said first position; and machine executable code that, if said requested data is in the cache and said requested data is associated with a cache slot currently in the cache, positions said cache slot to a third position within the cache wherein said third position causes said cache slot to remain in said cache as least as long as if said cache slot is at said second position.

20. The computer program product of claim 19, wherein said cache is included in a second level buffer cache.

21. The computer program product of claim 20, wherein said cache is included in a data storage system of said computer system.

22. The computer program product of claim 20, wherein said first position of said cache slot is a middle position within said cache indicating an age of said cache slot relative to other cache slots.

23. The computer program product of claim 22, wherein said third position of said cache slot is at the head of the cache indicating that said cache slot is a youngest cache slot.

24. The computer program product of claim 23, further comprising machine executable code that, when said cache slot is positioned at said third position, sets a flag associated with said cache slot to indicate a cache hit for a portion of data associated with said cache slot that is included in the cache; and when said cache slot is positioned to said first position, initializes said flag to zero.

25. The computer program product of claim 24, further comprising machine executable code that, when positioning said cache slot at said second position, makes a determination as to whether said flag is set.

26. The computer program product of claim 25, further comprising:
    machine executable code that, if said flag is set, positions said cache slot at a second position which is said middle position of said cache if said second position of said cache slot causes said cache slot to remain in said cache longer than a current position of said cache slot.

27. The computer program product of claim 26, further comprising:
    machine executable code that, if said flag is not set, unconditionally positions said cache slot at a second position which is said middle position of said cache.

28. The computer program product of claim 20, wherein said first position of said cache slot is at a head of said cache indicating that said cache slot is a youngest cache slot and a flag associated with said cache slot is initialized to zero.

29. The computer program product of claim 28, wherein said third position of said cache slot is at a head of said cache indicating that said cache slot is a youngest cache slot and a flag associated with said cache slot is set to one.

30. The computer program product of claim 29, wherein said second position is a current position of said cache slot if said flag associated with said cache slot is one, and said second position is a head of said cache indicating that said cache slot is a youngest cache slot otherwise.

31. The computer program product of claim 30, further comprising:
    machine executable code that obtains an available cache slot, wherein, upon determining that there are no available cache slots, displaces a cache slot having a flag equal to zero.

32. The computer program product of claim 31, further comprising machine executable code that, upon examining a cache slot to determine if a slot is available, sets the flag associated with said cache slot to zero if said flag is set to one.

33. The computer program product of claim 32, wherein a track of a storage device comprising a plurality of data blocks is associated with said cache slot, and said requested data is for one of said plurality of data blocks associated with said cache slot.

34. The computer program product of claim 33, wherein an invalid block vector is associated with said cache slot indicating which of said plurality of data blocks associated with said track are included in said cache.

35. The computer program product of claim 27, wherein a track of a storage device comprising a plurality of data blocks is associated with said cache slot, said requested data is for one of said plurality of data blocks associated with said cache slot.

36. The computer program product of claim 35, wherein an invalid block vector is associated with said cache slot indicating which of said plurality of data blocks associated with said track are included in said cache.

* * * * *